United States Patent
Wong

(10) Patent No.: US 12,267,841 B2
(45) Date of Patent: Apr. 1, 2025

(54) COMMUNICATIONS DEVICES, INFRASTRUCTURE EQUIPMENT, AND METHODS

(71) Applicant: Sony Group Corporation, Tokyo (JP)

(72) Inventor: Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 531 days.

(21) Appl. No.: 17/620,752

(22) PCT Filed: Jun. 12, 2020

(86) PCT No.: PCT/EP2020/066261
§ 371 (c)(1),
(2) Date: Dec. 20, 2021

(87) PCT Pub. No.: WO2021/001134
PCT Pub. Date: Jan. 7, 2021

(65) Prior Publication Data
US 2022/0346134 A1 Oct. 27, 2022

(30) Foreign Application Priority Data
Jul. 1, 2019 (EP) .................................. 19183677

(51) Int. Cl.
*H04W 72/23* (2023.01)
*H04W 28/06* (2009.01)
*H04W 72/0446* (2023.01)

(52) U.S. Cl.
CPC ........... *H04W 72/23* (2023.01); *H04W 28/06* (2013.01); *H04W 72/0446* (2013.01)

(58) Field of Classification Search
CPC .. H04W 28/06; H04W 72/0446; H04W 72/23
See application file for complete search history.

(56) References Cited

U.S. PATENT DOCUMENTS 8,767,658 B2 * 7/2014 Zhu ..................... H04L 5/0053
375/267
10,512,072 B2 * 12/2019 Yi ....................... H04W 72/542
(Continued)

FOREIGN PATENT DOCUMENTS

CA     3124598 A1 *  7/2020 ............... H04L 1/08
CN   103548409 A     1/2014
(Continued)

OTHER PUBLICATIONS

OPPO, "Text proposal on DL/UL resource allocation", 3GPP TSG RAN WG1 Meeting AH 1801 R1-1800488, Jan. 13, 2018, 7 pgs.
(Continued)

*Primary Examiner* — Eric Nowlin
(74) *Attorney, Agent, or Firm* — XSENSUS, LLP

(57) ABSTRACT

A communications device configured to transmit data to or receive data from an infrastructure equipment of a wireless communications network is provided. The communications device comprises transceiver circuitry configured to transmit signals and receive signals via a wireless access interface provided by the wireless communications network, and controller circuitry configured in combination with the transceiver circuitry to receive, from the infrastructure equipment, in one of a plurality of sets of radio resources each forming a physical downlink control channel, PDDCH, in a first time divided slot of the wireless access interface, one of an uplink grant indicating an allocation of radio resources forming one of a physical uplink shared channel, PUSCH, of the wireless access interface and a downlink grant indicating an allocation of radio resources forming a physical downlink shared channel, PDSCH, of the wireless access interface, and to determine if a specified condition has been met.

19 Claims, 10 Drawing Sheets

(56) References Cited

U.S. PATENT DOCUMENTS

| | | | | |
|---|---|---|---|---|
| 10,932,250 | B2* | 2/2021 | Ugurlu | H04L 5/0091 |
| 11,025,456 | B2* | 6/2021 | Chatterjee | H04L 5/0048 |
| 11,102,771 | B2* | 8/2021 | Yi | H04J 11/00 |
| 11,219,056 | B2* | 1/2022 | Takeda | H04W 72/53 |
| 11,394,496 | B2* | 7/2022 | Wong | H04L 1/1812 |
| 11,457,434 | B2* | 9/2022 | Ying | H04L 1/0061 |
| 11,490,410 | B2* | 11/2022 | Xu | H04W 72/23 |
| 11,758,558 | B2* | 9/2023 | Takeda | H04W 72/53 370/329 |
| 2019/0082431 | A1* | 3/2019 | Yi | H04W 72/0446 |
| 2019/0149365 | A1* | 5/2019 | Chatterjee | H04L 25/0226 370/329 |
| 2019/0190763 | A1* | 6/2019 | Takeda | H04L 27/2602 |
| 2019/0327759 | A1* | 10/2019 | Lee | H04W 72/1268 |
| 2019/0387506 | A1* | 12/2019 | Ugurlu | H04L 5/0091 |
| 2019/0394759 | A1* | 12/2019 | Ying | H04L 1/0061 |
| 2020/0120650 | A1* | 4/2020 | Yi | H04W 72/542 |
| 2020/0196284 | A1* | 6/2020 | Wang | H04W 72/23 |
| 2021/0100021 | A1* | 4/2021 | Xu | H04L 5/003 |
| 2021/0120574 | A1* | 4/2021 | Takeda | H04W 72/23 |
| 2021/0352638 | A1* | 11/2021 | Yi | H04L 5/0053 |
| 2022/0086873 | A1* | 3/2022 | Wong | H04W 72/0446 |
| 2022/0086895 | A1* | 3/2022 | Takeda | H04W 72/23 |
| 2022/0311554 | A1* | 9/2022 | Wong | H04L 1/1812 |
| 2022/0346134 | A1* | 10/2022 | Wong | H04W 72/23 |
| 2023/0070829 | A1* | 3/2023 | Fröberg Olsson | H04L 1/08 |
| 2023/0179385 | A1* | 6/2023 | Wang | H04L 5/0023 370/330 |

FOREIGN PATENT DOCUMENTS

| | | | | |
|---|---|---|---|---|
| EP | 2498562 A1 * | 9/2012 | | H04L 5/0041 |
| EP | 2498562 B1 * | 10/2019 | | H04L 5/0041 |
| EP | 3903436 B1 * | 4/2023 | | H04L 1/08 |
| WO | 2018/175805 A1 | 9/2018 | | |
| WO | WO-2018167958 A1 | 9/2018 | | |
| WO | 2019/050379 A1 | 3/2019 | | |
| WO | WO-2019050143 A1 | 3/2019 | | |
| WO | WO-2020144346 A1 * | 7/2020 | | H04L 1/08 |
| WO | WO-2021001134 A1 * | 1/2021 | | H04W 28/06 |
| WO | WO-2021229527 A1 * | 11/2021 | | H04B 7/0695 |

OTHER PUBLICATIONS

International Search Report and Written Opinion mailed on Sep. 16, 2020, received for PCT Application PCT/EP2020/066261, Filed on Jun. 12, 2020, 13 pages.
NTT DOCOMO Inc., "Consideration on NR TDD Configuration", 3GPP TSG-RAN WG4 Meeting #86-bis, R4-1804978, Apr. 16-20, 2018, 5 pages.
3GPP, "Medium Access Control (MAC) Protocol Specification (Release 15)", 3GPP TS 38.321 V15.3.0, Sep. 2018, 76 pages.
Holma et al., "LTE for UMTS OFDMA and SC-FDMA Based Radio Access", John Wiley and Sons, 2009, pp. 25-27.
Huawei et al., "PDCCH Enhancements for URLLC", 3GPP TSG RAN WG1 Meeting #97, R1-1906057, May 13-17, 2019, 11 pages.
Nokia et al., "On PDCCH Enhancements for NR URLLC", 3GPP TSG RAN WG1#97, R1-1906751, May 13-17, 2019, 21 pages.
Nokia et al., "Revised SID: Study on NR Industrial Internet of Things (IoT)", 3GPP TSG RAN meeting #81, RP-182090, Sep. 10-13, 2018, 5 pages.
Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

* cited by examiner

COMMUNICATIONS DEVICES, INFRASTRUCTURE EQUIPMENT, AND METHODS

CROSS-REFERENCE TO RELATED APPLICATIONS

The present application is based on PCT filing PCT/EP2020/066261, filed Jun. 12, 2020, which claims priority to EP 19183677.4, filed Jul. 1, 2019, the entire contents of each are incorporated herein by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems [1], as well as future iterations/releases of existing systems, to efficiently support connectivity for a wide range of devices associated with different applications and different characteristic data traffic profiles.

One example of a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a communications device configured to transmit data to or receive data from an infrastructure equipment of a wireless communications network. The communications device comprises transceiver circuitry configured to transmit signals and receive signals via a wireless access interface provided by the wireless communications network, and controller circuitry configured in combination with the transceiver circuitry to receive, from the infrastructure equipment, in one of a plurality of sets of radio resources each forming a physical downlink control channel, PDDCH, in a first time divided slot of the wireless access interface, one of an uplink grant indicating an allocation of radio resources forming a physical uplink shared channel, PUSCH, of the wireless access interface, and a downlink grant indicating an allocation of radio resources forming a physical downlink shared channel, PDSCH, of the wireless access interface, and to determine if a specified condition has been met. If the specified condition has been met, the controller circuitry is configured in combination with the transceiver circuitry to determine the one of the allocation of radio resources forming the PUSCH from the uplink grant and the allocation of radio resources forming the PDSCH from the downlink grant based on at least a first parameter, wherein the communications device is configured to interpret a value of the first parameter as indicating a number of symbols between a specified point associated with the PDCCH in which the one of the uplink grant and the downlink grant was received and a first symbol of the one of the PUSCH and the PDSCH. If the specified condition has not been met, the controller circuitry is configured in combination with the transceiver circuitry to determine the one of the allocation of radio resources forming the PUSCH from the uplink grant and the allocation of radio resources forming the PDSCH from the downlink grant based on at least the first parameter, wherein the communications device is configured to interpret a value of the first parameter as indicating a number of symbols between the start of the first time divided slot and a first symbol of the one of the PUSCH and the PDSCH.

Embodiments of the present technique, which further relate to infrastructure equipment, methods of operating communications devices and infrastructure equipment, and circuitry for communications devices and infrastructure equipment, allow for the enhancement of resource efficiency for URLLC and eURLLC services, since more scheduling opportunities are provided in each slot, thereby increasing latency, without increasing the size of DCI used to carry a DL Grant or an UL Grant.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
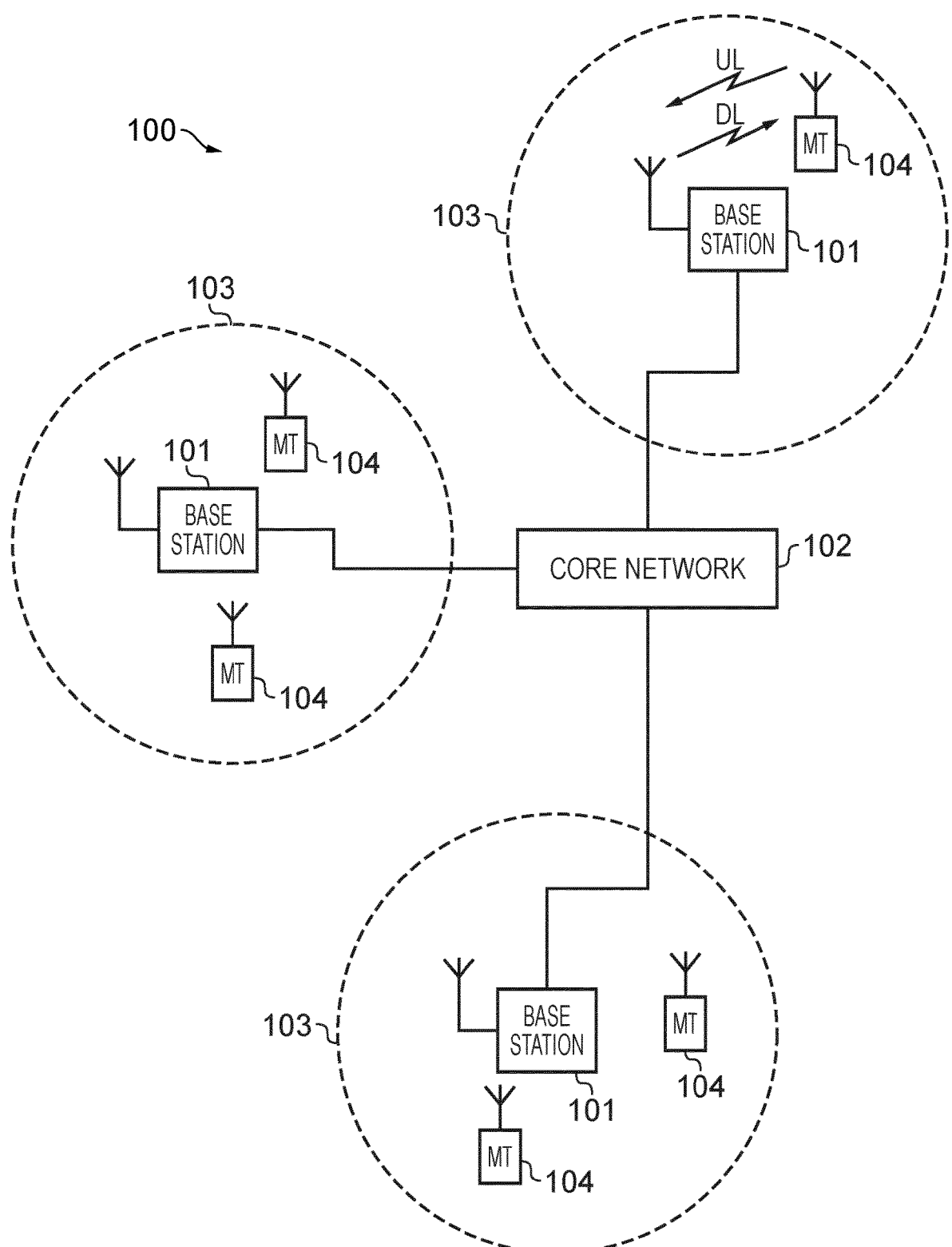
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
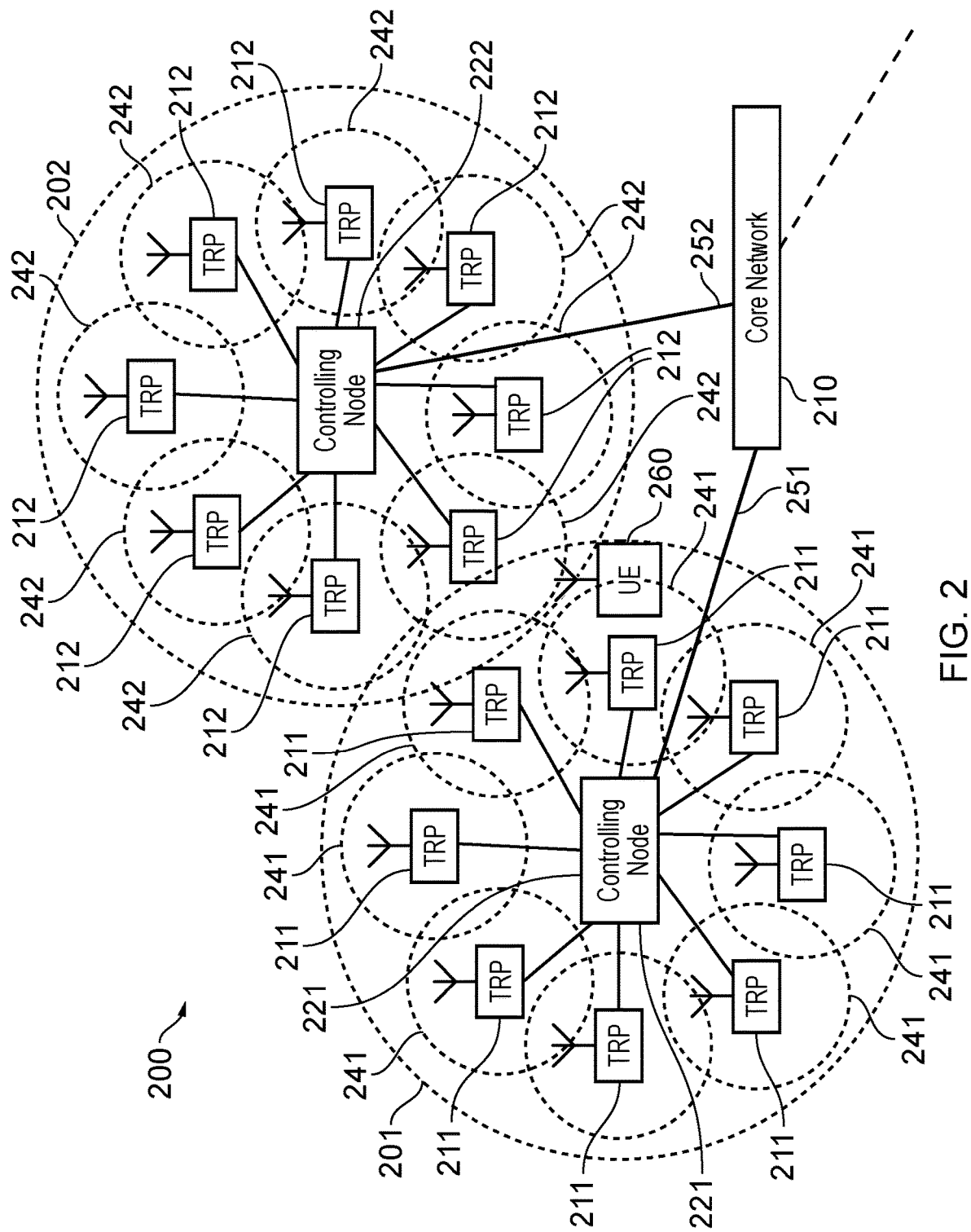
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
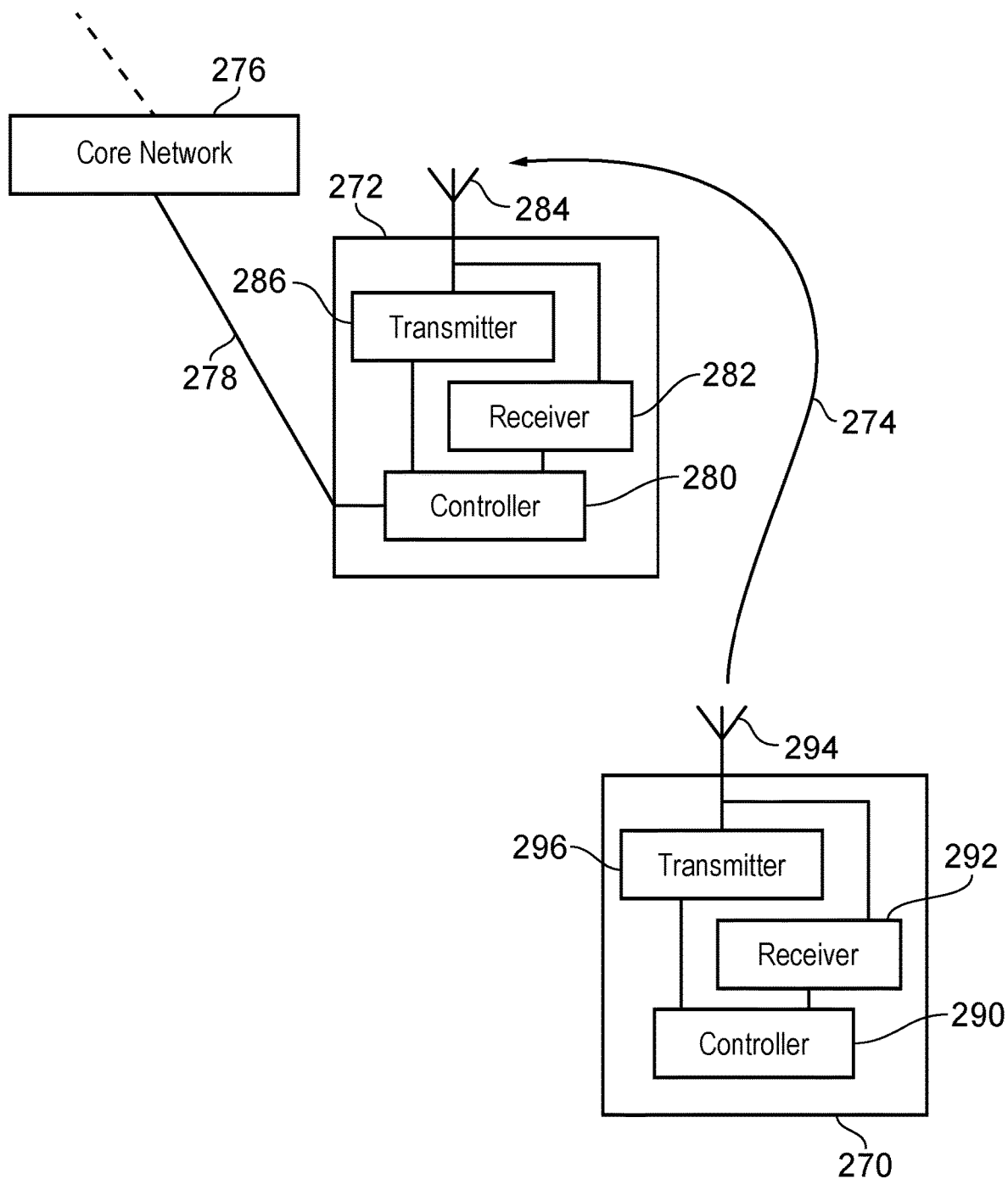
FIG. 3 is a schematic block diagram of an example infrastructure equipment and communications device which may be configured to operate in accordance with certain embodiments of the present disclosure.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. The UE 270 may similarly be configured to receive downlink data transmitted by the infrastructure equipment 272 via resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G and eURLLC

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1-10^{-5}$ (99.999%) or higher for one transmission of a 32 byte packet with a user plane latency of 1 ms [3]. In some scenarios, there may be a requirement for a reliability of $1-10^{-6}$ (99.9999%) or higher. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

eURLLC [4] specifies features that require high reliability and low latency such as factory automation, transport industry, electrical power distribution, etc. One of the objectives or eURLLC is to enhance the PDCCH, where the aim is to design a compact DCI and increase URLLC UE PDCCH monitoring capabilities for shorter PDCCH periodicity.

The resources occupied by PDSCH and PUSCH can be dynamically allocated by the gNB using a DL grant and UL grant respectively, where these grants are carried by a DCI.

The resources granted for PDSCH or PUSCH are indicated in the Frequency Domain Resource Assignment (FDRA) and Time Domain Resource Assignment (TDRA) fields. The FDRA indicates the number and location of the PRBs occupied by the PDSCH or PUSCH. The TDRA is an index to a lookup TRDA table, where each entry in the table contains information of the PDSCH/PUSCH transmission such as the start of the transmission, the duration of the transmission, the mapping type and DMRS locations. The start and duration parameters allow for a flexible time resource allocation in 5G. The entries in the TDRA table are semi-statically configured by RRC and the size of the table can be up to 16 entries.

Figure 4:
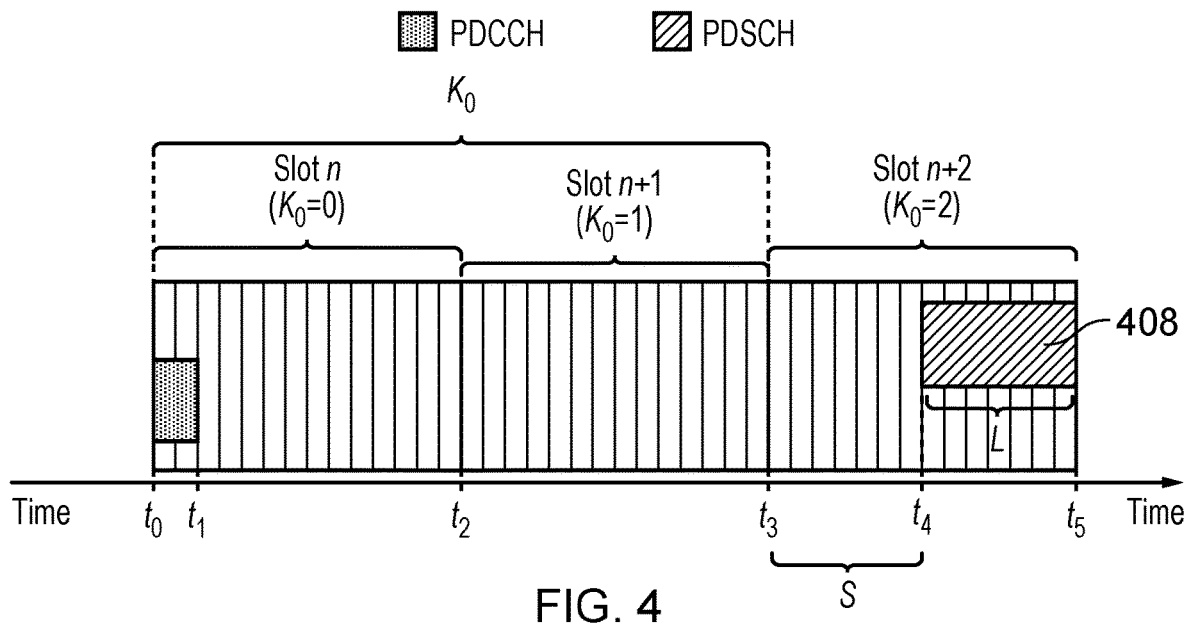
FIG. 4 illustrates the Physical Downlink Shared Channel (PDSCH) Time Domain Resource Assignment (TDRA) parameters $K_0$, S and L.

For PDSCH, the parameters in the TDRA table are the DMRS position(s), PDSCH Mapping Type (A or B), slot gap $K_0$ between the DL Grant and the PDSCH, the PDSCH start symbol offset from slot boundary and the duration of the PDSCH L. FIG. 4 shows an example of a TDRA for PDSCH, where a DL Grant is transmitted to the UE at time t0 using a PDCCH which ends at time $t_1$ in Slot n. The DL Grant's TDRA points to an entry in the TDRA Lookup Table which indicates parameters $K_0=2$, S=7 and L=7. Since the DL Grant is in Slot n, the PDSCH therefore starts in Slot $n+K_0$, i.e. Slot n+2. The symbol offset from the slot boundary of Slot n+2 is indicated in the parameter S, which in this case is 7 symbols from the slot boundary, i.e. the PDSCH starts at time $t_4$. The duration of the PDSCH is L=7 symbols. Hence, the TDRA parameters indicate a PDSCH transmission between time $t_4$ and $t_5$ as shown in FIG. 4.

Figure 5:
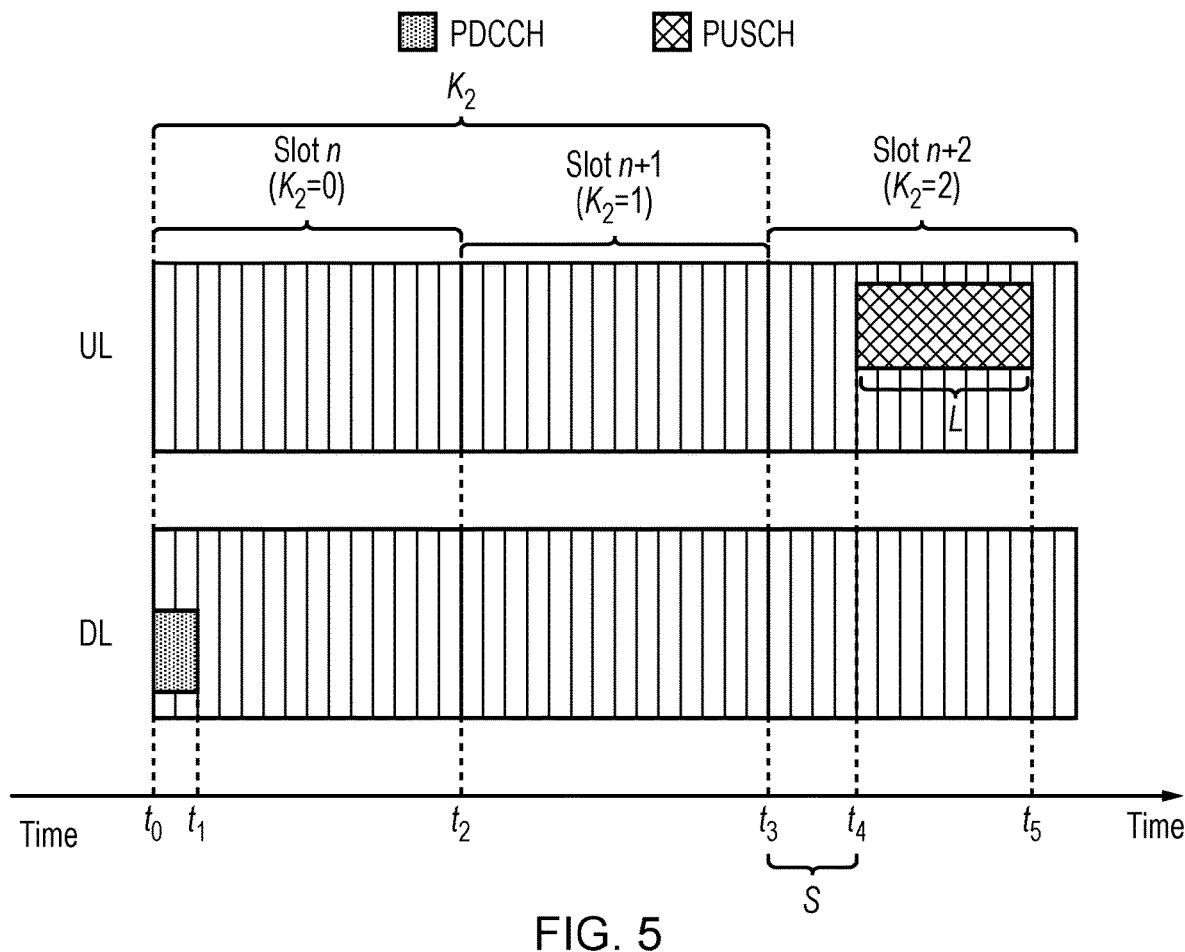
FIG. 5 illustrates the Physical Uplink Shared Channel (PUSCH) Time Domain Resource Assignment (TDRA) parameters $K_2$, S and L.

Similarly for PUSCH, the parameters in the TDRA table are the PUSCH Mapping Type (A or B), slot gap $K_2$ between the UL Grant and the PUSCH, the PUSCH start symbol offset from slot boundary S and the duration of the PUSCH L. FIG. 5 shows an example TDRA for PUSCH, where an UL Grant is transmitted to the UE at time t0 using PDCCH which ends at time $t_1$ in Slot n. The UL Grant's TDRA points to an entry in the TDRA Lookup Table which indicates parameters $K_2=2$, S=4 and L=8. Since the UL Grant is in Slot n, the PUSCH therefore starts in Slot $n+K_2$, i.e. Slot n+2. The symbol offset from the slot boundary of Slot n+2 is indicated in the parameter S, which in this case is 4 symbols from the slot boundary, i.e. the PUSCH starts at time $t_4$. The duration of the PDSCH is L=8 symbols. Hence, the TDRA parameters indicate a PUSCH transmission between time $t_4$ and $t_5$ as shown in FIG. 5.

Figure 6:
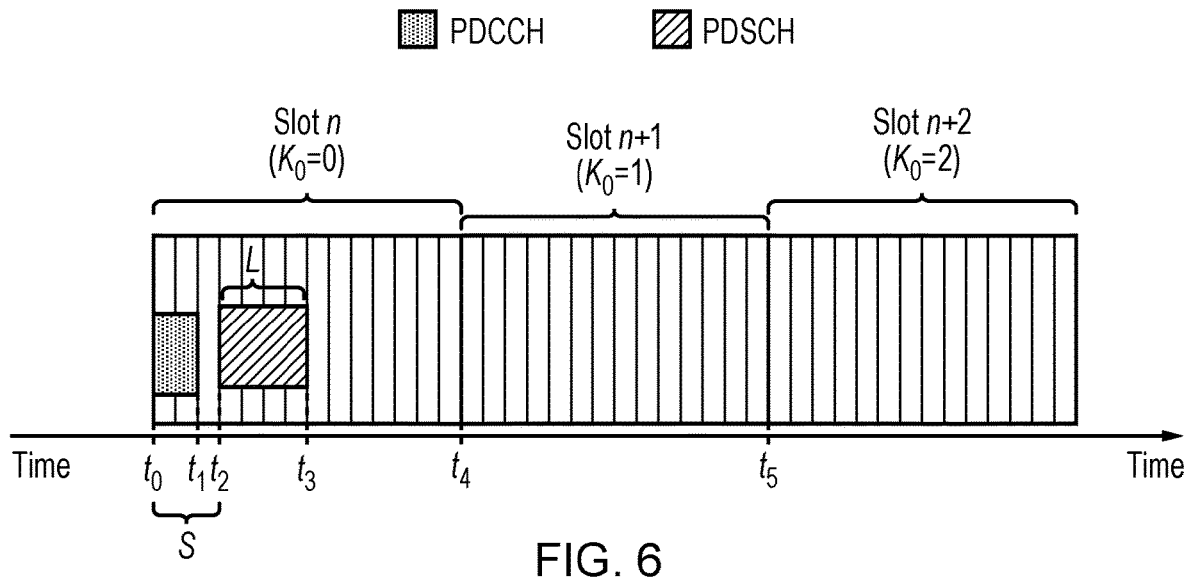
FIG. 6 shows a first PDSCH scheduling example in which a PDSCH is allocated one symbol after the downlink grant, where $K_0=0$, S=3, and L=4.
Figure 7:
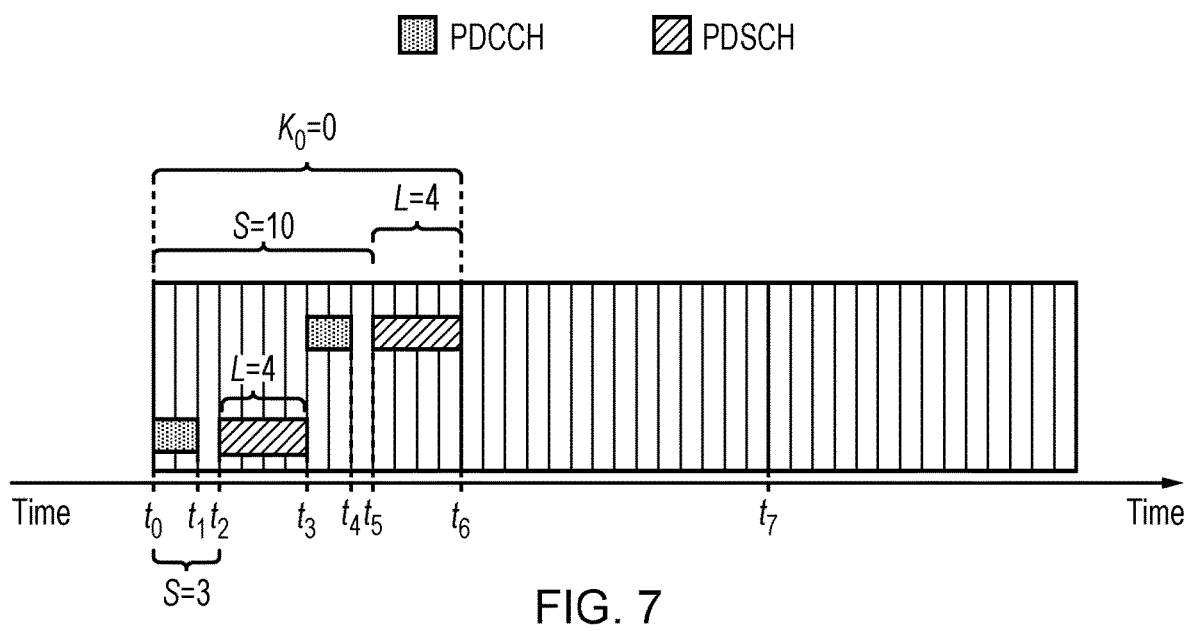
FIG. 7 shows a second PDSCH scheduling example in which two PDSCHs are allocated one symbol after their respective downlink grants, where $K_0=0$, S=3, and L=4 for the first PDSCH and $K_0=0$, S=10, and L=4 for the second PDSCH.

In Rel-15, services that are not latency sensitive, such as eMBB, have a scheduling period (i.e. PDCCH monitoring period) of one or more slots. The TDRA table hence provides a flexible way of allocating the PDSCH/PUSCH. However, for URLLC, the PDCCH monitoring periodicity is shorter than a slot (e.g. every 2 symbols or half slot) to provide more scheduling opportunities thereby reducing latency in scheduling a PDSCH/PUSCH. It is recognised in 3GPP that the existing TDRA parameters are not efficient for URLLC where the PDCCH monitoring period is shorter and the PDSCH/PUSCH is likely allocated close (in time) to the PDCCH. To explain this consider an example where the URLLC PDSCH (or PUSCH) needs to be transmitted within 1 symbol of the DL Grant (or UL Grant) as shown in FIG. 6, the corresponding TDRA parameters are $K_0=0$, S=3 and L=4. However, if the PDCCH monitoring period is every 7 symbols (half slot) then to have the same PDSCH allocation where it starts 1 symbol after the DL Grant, two entries are required, i.e. one entry with $K_0=0$, S=3 and L=4 and another entry with $K_0=0$, S=10 and L=4, which is shown in FIG. 7. That is multiple TDRA entries are required for the same PDSCH allocation where each entry is for a different PDCCH monitoring occasion. Hence, the shorter the PDCCH monitoring period, the more TDRA entries are required to schedule a low latency PDSCH (or PUSCH). As described the TDRA has at most 16 entries in Rel-15 and if the PDCCH monitoring periodicity is every 2 symbols (i.e. 7 PDCCH occasions per slot) then for a single PDSCH that needs to start 1 symbol after the DL Grant would occupy 7 entries in the TDRA table leaving only 9 entries for other allocation. The TDRA table can be increased to cater for different PDCCH monitoring occasions however this would increase the DCI size which go against the objective of the eURLLC Work Item.

Figure 8:
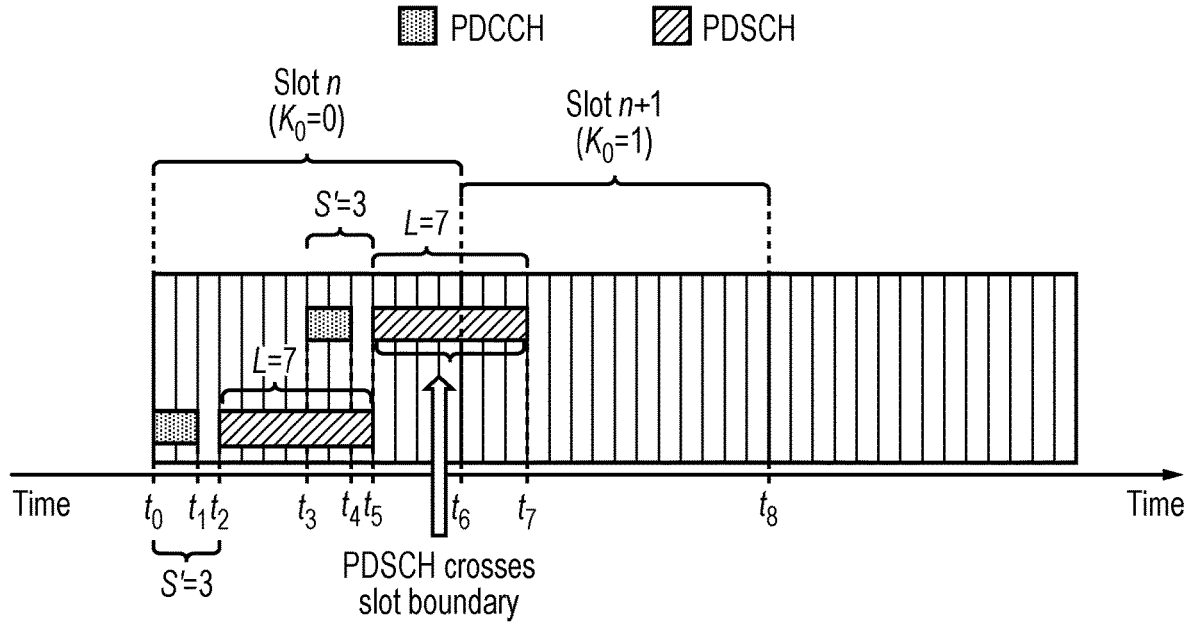
FIG. 8 shows a third PDSCH scheduling example in which an offset symbol S' relative to the start of a Physical Downlink Control Channel (PDCCH) causes a PDSCH to cross the slot boundary.

Recognising the inefficiency of using Rel-15 TDRA parameters for low latency services such as URLLC, in some known proposals [5], [6] the parameter S is referenced to the start or end symbol of the PDCCH instead of to the start of the slot boundary, which would reduce the number of TDRA entries for different PDCCH monitoring occasion. For example, let S' be the offset symbol relative to the start of the PDCCH, then for the example in FIG. 7 where a PDSCH allocated is 1 symbol after the end of PDCCH in a 7 symbols PDCCH periodicity, only one entry where S'=3 is required for both PDCCH monitoring occasions (starting at time to and $t_3$ of FIG. 7, and this is shown in FIG. 8). However, it is argued that using S relative to the PDCCH monitoring occasion may lead to a PDSCH or PUSCH crossing a slot boundary. For example, if we want a PDSCH that starts 1 symbol after the PDCCH as in the example in FIG. 8 we can use S'=3 but if the PDSCH duration L=7 symbols, the $2^{nd}$ PDCCH starting at time $t_3$ would schedule a PDSCH that crosses slot boundary as shown in FIG. 8 where the PDSCH starting at time $t_5$ which is S'=3 symbols from the start of the PDCCH at time $t_3$, crosses slot n and n+1. The parameter $K_0$ would therefore be redundant.

Figure 9:
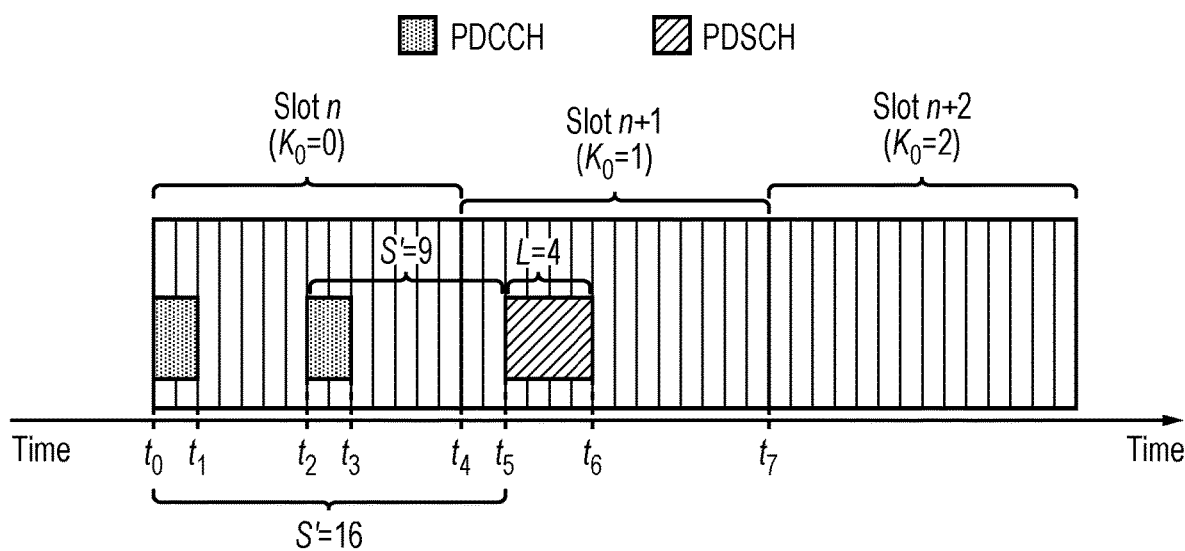
FIG. 9 shows a fourth PDSCH scheduling example in which two TDRA entries are used to allocate a single PDSCH in the next slot.

Another drawback for using a reference such as S' (relative to the start or end of PDCCH) is that if the gNB wishes to schedule the PDSCH or PUSCH at a particular starting point in the next slot, it would require multiple entries in the TDRA table for each PDCCH monitoring occasion. For example in FIG. 9, the gNB wants to allocate a PDSCH in the next slot with an offset of 2 symbols from slot boundary. If the S' parameter reference is from the start of the PDCCH, then to do this, the gNB requires two entries, one for each PDCCH monitoring occasion. That is for the PDCCH starting at time to, the gNB require a TDRA entry S'=16 and L=4 and for the PDCCH starting at time $t_2$, it requires another TDRA entry S'=9 and L=4. In contrast the legacy method requires only a single entry $K_0$=1, S=2, L=4 for both PDCCH monitoring occasions.

Time Domain Resource Reference in URLLC

Figure 10:
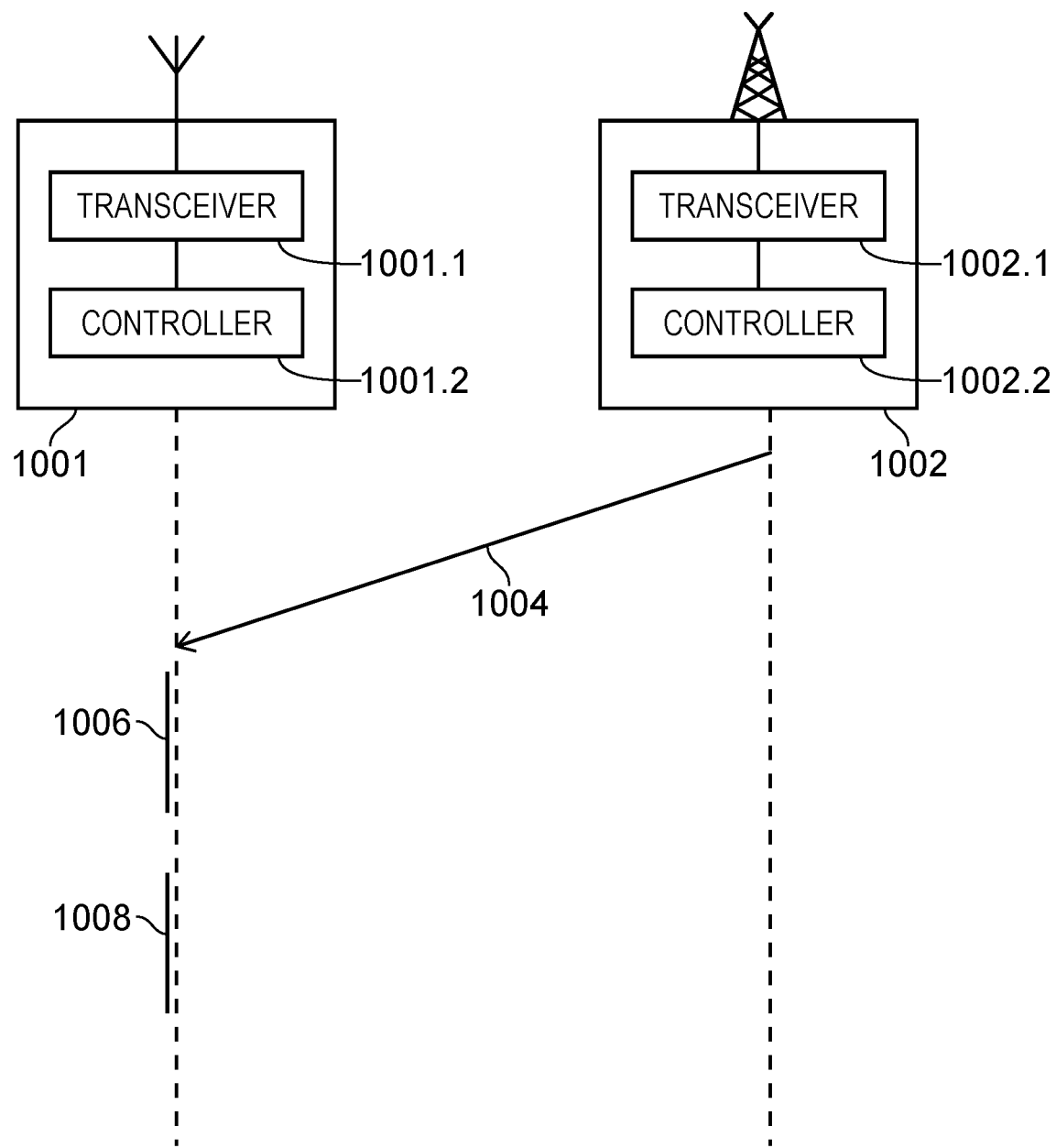
FIG. 10 shows a part schematic, part message flow diagram representation of a wireless communications network comprising a communications device and an infrastructure equipment in accordance with embodiments of the present technique.

FIG. 10 shows a part schematic, part message flow diagram representation of a wireless communications network comprising a communications device 1001 and an infrastructure equipment 1002 in accordance with embodiments of the present technique. The communications device 1001 is configured to transmit data to or receive data from an infrastructure equipment 1002. The communications device 1001 and the infrastructure equipment 1002 each comprise a transceiver (or transceiver circuitry) 1001.1, 1002.1, and a controller (or controller circuitry) 1001.2, 1002.2. Each of the controllers 1001.2, 1002.2 may be, for example, a microprocessor, a CPU, or a dedicated chipset, etc.

The transceiver circuitry 1001.1 and the controller circuitry 1001.2 of the communications device 1001 are configured in combination to receive 1004, from the infrastructure equipment 1002, in one of a plurality of sets of radio resources each forming a physical downlink control channel, PDDCH, in a first time divided slot of the wireless access interface, an uplink grant indicating one of an allocation of radio resources forming a physical uplink shared channel, PUSCH, of the wireless access interface and a downlink grant indicating an allocation of radio resources forming a physical downlink shared channel, PDSCH, of the wireless access interface, and to determine 1006 if a specified condition has been met. If the specified condition has been met, the controller circuitry 1001.2 is configured in combination with the transceiver circuitry 1001.1 to determine 1008 the one of the allocation of radio resources forming the PUSCH from the uplink grant and the allocation of radio resources forming the PDSCH from the downlink grant based on at least a first parameter, wherein the communications device 1001 is configured to interpret a value of the first parameter as indicating a number of symbols between a specified point associated with the PDCCH in which the one of the uplink grant and the downlink grant was received and a first symbol of the one of the PUSCH and the PDSCH, or if the specified condition has not been met, the controller circuitry 1001.2 is configured in combination with the transceiver circuitry 1001.1 to determine 1008 the one of the allocation of radio resources forming the PUSCH from the uplink grant and the allocation of radio resources forming the PDSCH from the downlink grant based on at least the first parameter, wherein the communications device is configured to interpret a value of the first parameter as indicating a number of symbols between the start of the first time divided slot and a first symbol of the one of the PUSCH and the PDSCH.

Following this, the controller circuitry 1001.2 is configured in combination with the transceiver circuitry 1001.1 may then be configured either to transmit uplink data in the determined radio resources forming the PUSCH or receive downlink data in the determined radio resources forming the PDSCH.

Essentially, embodiments of the present technique propose that a first parameter—for example the TDRA parameter S, though in some arrangements as described below, the first parameter is a new TDRA parameter—should be interpreted differently by a UE depending on some pre-determined conditions. The communications device may be configured to receive an indication of an index of a look-up table, to determine a value of the first parameter (e.g. S) from the look-up table in accordance with the indicated index, and to determine, from the look-up table in accordance with the indicated index, whether the value of the first parameter indicates a number of symbols between the specified point associated with the PDCCH and the first symbol of the one of the PUSCH and the PDSCH, or whether the value of the first parameter indicates a number of symbols between the start of the first time divided slot and the first symbol of the one of the PUSCH and the PDSCH. However, alternatively, the first parameter may be received from or indicated by the infrastructure equipment in another manner to being part of a TDRA look-up table to which an index is indicated by the infrastructure equipment.

Figure 11:
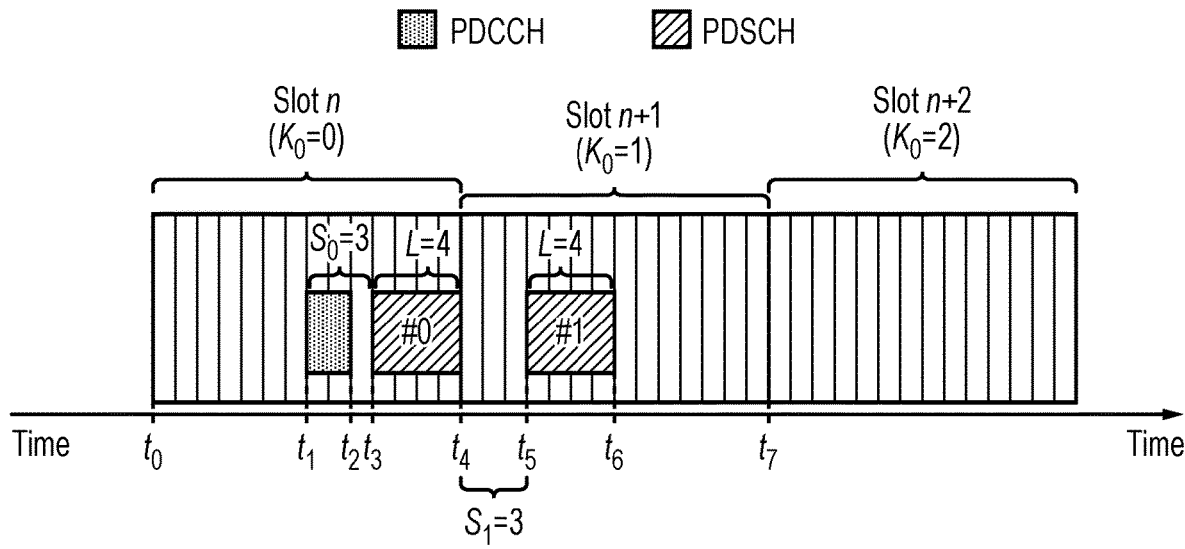
FIG. 11 shows an example in which a TDRA may have difference reference points for the parameter S in accordance with embodiments of the present technique.

In an arrangement of embodiments of the present technique, the said pre-determined condition is the value of the slot offset, i.e., $K_0$ for PDSCH or $K_2$ for PUSCH. In other words, the specified condition is a value of a second parameter, wherein the second parameter indicates a number of time divided slots of the wireless access interface after the first time divided slot to a second time divided slot of the wireless access interface within which the one of the PUSCH and the PDSCH is located. That is, the parameter S reference is relative to a particular PDCCH point (e.g. the start or end of PDCCH, which is further discussed below) if the slot offset is zero (i.e. $K_0=0$ or $K_2=0$), though another value of the slot offset may be used in accordance with this arrangement. Otherwise, the parameter S reference is relative to the slot boundary. For example, consider two TDRA entries in Table I. For a PDCCH starting at time $t_1$ in FIG. 11, the PDSCH using index 0 and index 1 are shown labelled as #0 and #1 respectively. For TDRA Index 0, $K_0=0$ and hence S (labelled as $S_0$) is interpreted such that it is an offset relative to the start of the PDCCH, i.e. the said PDCCH point is the start of the PDCCH transmission. It should be noted, and appreciated by those skilled in the art, that this arrangement is also applicable if the reference is the end of PDCCH, or any other specified point associated with the PDCCH. The PDSCH using TDRA Index 0 would therefore starts at time $t_3$ as shown in FIG. 11. For TDRA Index 1, $K_0=1$ and hence S (labelled as $S_1$) is interpreted such that it is an offset relative to the start of the slot boundary of the slot indicated by $K_0$. The PDSCH using TDRA Index 1 would therefore starts at time $t_5$ as shown in FIG. 11. It will be appreciated by those skilled in the art that, although the example in FIG. 11 shows the scheduling of a PDSCH, this arrangement is applicable for a PUSCH is scheduled instead. The same is true of all other arrangements and embodiments in this present disclosure; those described by way of a PDSCH are equally applicable to PUSCH, and vice versa.

TABLE I

TDRA table

| Index | $K_0$ | L | S | Comment |
|---|---|---|---|---|
| 0 | 0 | 4 | 3 | S is symbol offset relative to PDCCH point |
| 1 | 1 | 4 | 3 | S is symbol offset relative to slot boundary |

Figure 12:
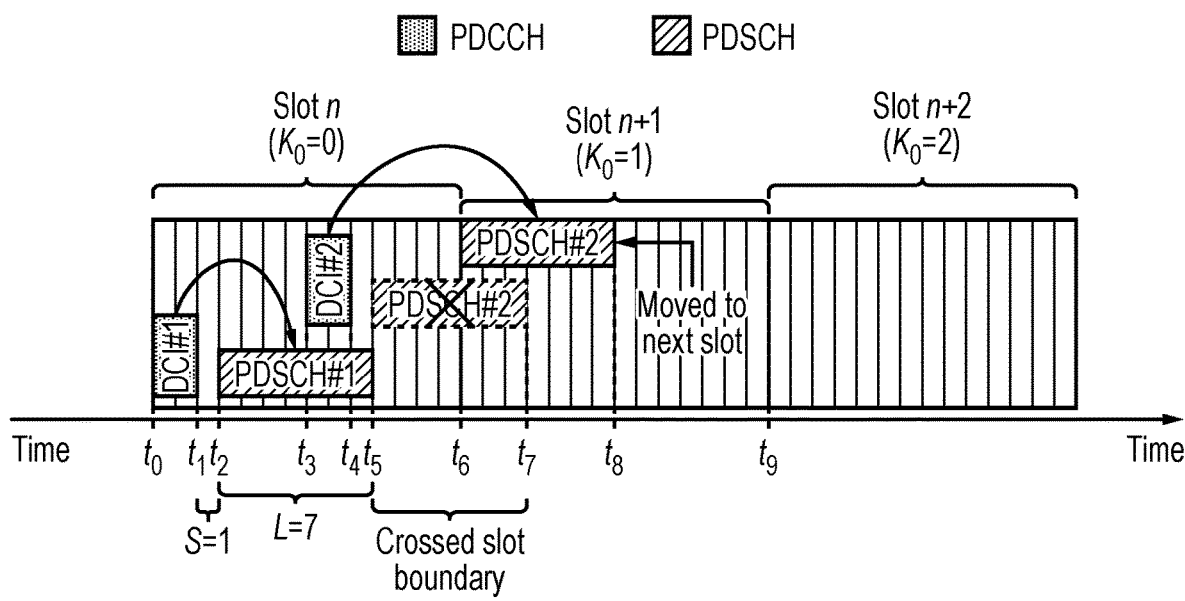
FIG. 12 shows a first example in which the parameter S may be reinterpreted when a PDSCH crosses the slot boundary in accordance with embodiments of the present technique.

In another arrangement of embodiments of the present technique, the parameter S is relative to the PDCCH point if the resultant PDSCH/PUSCH does not cross the slot boundary. Otherwise if using S relative to the PDCCH point causes the PDSCH/PUSCH to cross the slot boundary then S=0, i.e. the PDSCH/PUSCH starts at the beginning of the next slot. In other words, the specified condition is whether the one of the PUSCH and the PDSCH is wholly contained within a single time divided slot of the wireless access interface. If the specified condition has not been met, the value of the first parameter is 0, and the communications device is configured to determine that the one of the PUSCH and the PDSCH is contained within a temporally subsequent time divided slot to the first time divided slot. An example is shown in FIG. 12, where here the parameter S is the offset symbol relative to the end of the PDCCH transmission (it should be noted that this is to show that S can be relative to other points of the PDCCH than the beginning of the PDCCH as in FIG. 11 and again this is not intended to be limiting). Here, two DL Grants are transmitted to the UE carried by DCI #1 and DCI #2 where in each DL Grant, the TDRA index points to an entry in the TDRA table where $K_0=0$, S=1 & L=7. DCI #1 is transmitted at time to and ends at time $t_1$ and the corresponding PDSCH #1 starts from $t_2$ to $t_5$. Since PDSCH #1 does not cross the slot boundary, S is therefore relative to the end of DCI #1 (PDCCH). DCI #2 is transmitted between time $t_3$ to $t_4$ and if S is relative to end of DCI #2 then the corresponding PDSCH #2 would occupying time $t_5$ to $t_7$, thereby crossing the slot boundary at time $t_6$. As per this arrangement, since PDSCH #2 crosses slot boundary, S is reinterpreted as being S=0 in the next slot, i.e. slot n+1 thereby resulting in a PDSCH #2 being transmitted between time $t_6$ and $t_8$. It should be appreciated again, as above, that although the example in FIG. 12 describes PDSCH, this arrangement is also applicable to PUSCH.

Figure 13:
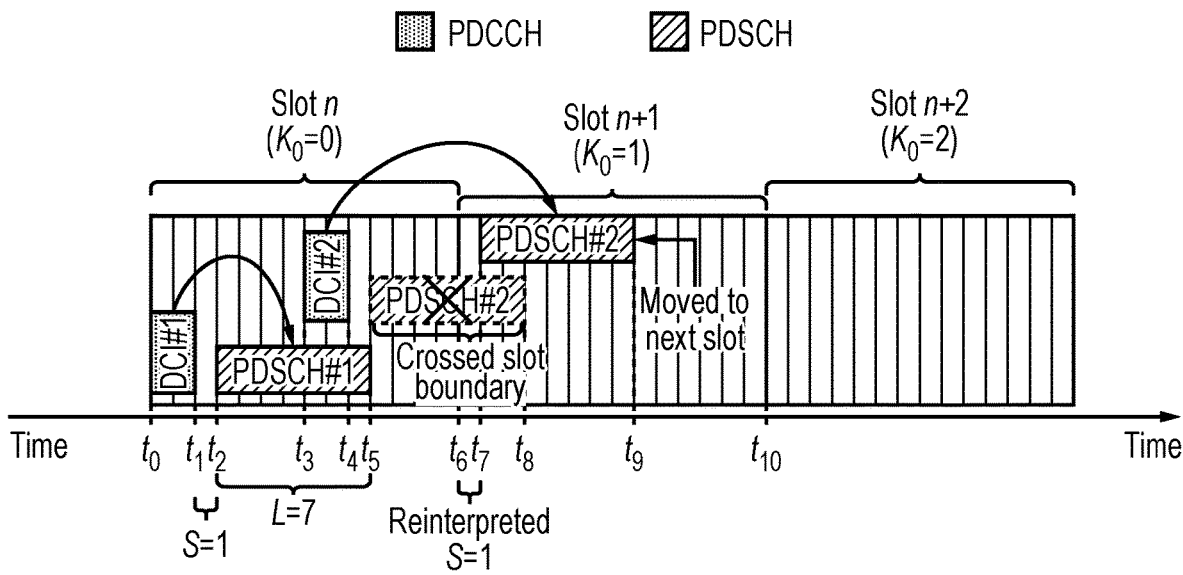
FIG. 13 shows a second example in which the parameter S may be reinterpreted when a PDSCH crosses the slot boundary in accordance with embodiments of the present technique.

In another arrangement of embodiments of the present technique, parameter S is relative to the PDCCH point if the resultant PDSCH/PUSCH does not cross the slot boundary. Otherwise if using S relative to the PDCCH point causes the PDSCH/PUSCH to cross the slot boundary, then S is interpreted to be relative to the next slot boundary, i.e. $K_0$ is incremented by 1. In other words, the specified condition is whether the one of the PUSCH and the PDSCH is wholly contained within a single time divided slot of the wireless access interface. If the specified condition has not been met, the value of the first parameter is the same as a value of the first parameter as if the specified condition had been met and the communications device is configured to determine that the one of the PUSCH and the PDSCH is contained within a temporally subsequent time divided slot to the first time divided slot. An example is shown in FIG. 13, where here the S is the offset symbol relative to the end of the PDCCH transmission. Similar to the example shown in FIG. 12, two DL Grants are transmitted to the UE carried by DCI #1 and DCI #2 where in each DL Grant, the TDRA index indicates to an entry in the TDRA table where $K_0=0$, S=1 & L=7. DCI #1 is transmitted at time $t_0$ and ends at time $t_1$ and the corresponding PDSCH #1 starts from $t_2$ to $t_5$. Since PDSCH #1 does not cross slot boundary, S is therefore relative to the end of DCI #1 (PDCCH). DCI #2 is transmitted between time $t_3$ to $t_4$ and if S is relative to end of DCI #2 then the corresponding PDSCH #2 would occupying time $t_5$ to $t_8$, thereby crossing slot boundary at time $t_6$. As per this arrangement, since PDSCH #2 crosses slot boundary, S is interpreted as being relative to the next slot, i.e. slot n+1 ($K_0=1$) resulting in a PDSCH #2 occupying time $t_7$ and $t_9$.

In another arrangement of embodiments of the present technique, a new TDRA parameter is introduced which may be labelled as M (or indeed any other label may be used) where M is the number of symbols offset relative to a PDCCH point. The existing S parameter follows the legacy interpretation, i.e. relative to the start of the slot boundary. A dynamic indicator indicates whether the UE uses S or M for the PDSCH or PUSCH. In other words, the predefined condition is the value of a dynamic indicator received by the communications device from the infrastructure equipment. This indicator can be a new field in the DCI or can be implicitly indicated (e.g. using different RNTI). An example is shown in Table II where the UE is indicated whether to use parameter M or S. It should be noted that when the parameter M is used, $K_2$ (or $K_0$) is not required. It should be appreciated that the example in Table II uses a PUSCH TDRA table (where slot gap is $K_2$) and this arrangement is again applicable for PDSCH.

TABLE II

PUSCH TDRA table with parameter M

| Index | $K_2$ | L | S | M |
|---|---|---|---|---|
| 0 | 0 | 4 | 3 | 1 |
| 1 | 0 | 7 | 2 | 2 |
| 2 | 1 | 4 | 7 | 1 |
| 3 | 1 | 7 | 2 | 2 |

In another arrangement of embodiments of the present technique, a dynamic indicator is used to indicate whether S is relative to the slot boundary or S is relative to a PDCCH point. This is similar to the previous arrangement where S=M, but where no new parameter M is introduced. In other words, again, the predefined condition is the value of a dynamic indicator received by the communications device from the infrastructure equipment In another arrangement of embodiments of the present technique, the network can configure, i.e. semi-statically indicate which entries in a TDRA table where the S parameter is relative to slot boundary or a PDCCH point. In other words, where the communications device is configured to receive an indication of an index of a look-up table, and to determine a value of the first parameter (e.g. S) from the look-up table in accordance with the indicated index, the predefined condition is the value of the indicated index. An example of a TDRA table with 4 entries implementing this arrangement is shown in Table III, where entry with Index 0 and 3, S is interpreted as relative to a PDCCH point, whereas Index 1 and 2 S is interpreted as relative to slot boundary. It should be noted that the S reference configuration (PDCCH point or slot boundary) is semi-statically (i.e. RRC) configured. It should be appreciated that although the example in Table III uses PDSCH TDRA table, this arrangement is also applicable for PUSCH.

TABLE III

PDSCH TDRA table with reference point indicator

| Index | $K_0$ | L | S | S Reference |
|---|---|---|---|---|
| 0 | 0 | 4 | 3 | PDCCH |
| 1 | 0 | 7 | 2 | Slot boundary |
| 2 | 1 | 4 | 7 | Slot boundary |
| 3 | 0 | 7 | 2 | PDCCH |

Figure 14:
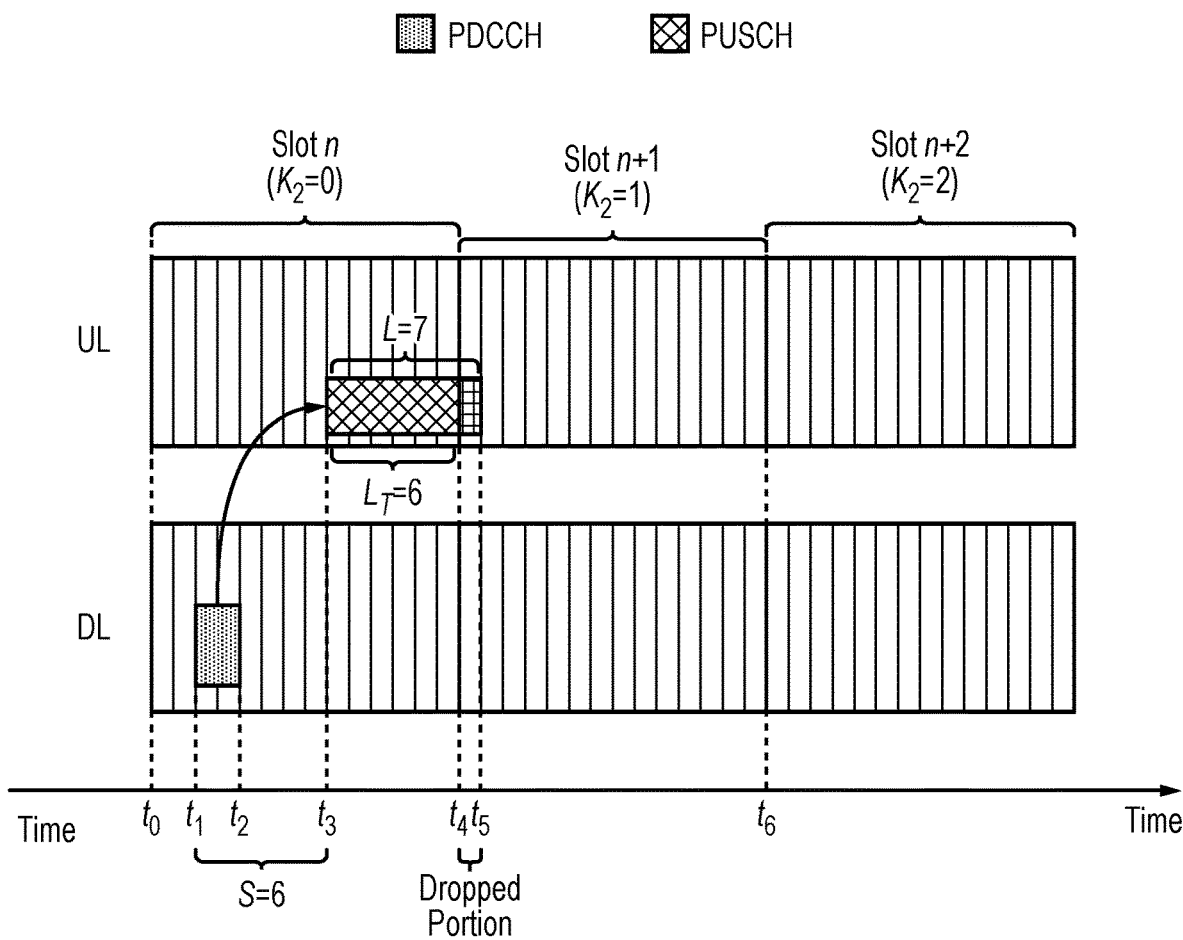
FIG. 14 shows an example in which a PUSCH may be truncated in accordance with embodiments of the present technique.

In another arrangement of embodiments of the present technique, when the S parameter (or M parameter as in some arrangements) is the symbol offset relative to a PDCCH point, the corresponding PDSCH/PUSCH is truncated at the slot boundary if less than or equals to N symbols crosses the slot boundary. That is the L parameter is reduced by the number of symbols crossing slot boundary, which is at most N symbols. N can be RRC configured or indicated in the DCI. In other words, if the specified condition has been met, the communications device is configured to determine whether the one of the PUSCH and the PDSCH is wholly contained within a single time divided slot of the wireless access interface, and if the one of the PUSCH and the PDSCH is not wholly contained within a single time divided slot of the wireless access interface, to determine if a number of symbols of the temporally posterior time divided slot containing a portion of the one of the PUSCH and the PDSCH is less than or equal to a predefined number of, N, symbols, and if the number of symbols of the temporally posterior time divided slot containing a portion of the one of the PUSCH and the PDSCH is less than or equal to N symbols, to determine that the one of the PUSCH and the PDSCH is truncated by between one and N symbols. In example is shown in FIG. 14 where an UL Grant carried by a DCI is transmitted at time $t_1$ to $t_2$ scheduling a PUSCH using TDRA parameters $K_2=0$, S=6 & L=7. Here S is relative to the start of the PDCCH and this resulted in a PUSCH transmission between time $t_3$ to $t_5$, which causes the PUSCH to cross slot boundary. In this example, N is configured to be 2 symbols. Since only one symbol of the PUSCH crosses slot boundary, the PUSCH is therefore truncated by 1 symbol resulting in a PUSCH with a duration of 6 symbols, i.e. the truncated duration $L_T=6$ symbols. It should be appreciated that although the example in FIG. 14 uses PUSCH, this arrangement is applicable to PDSCH.

In a further arrangement of embodiments of the present technique to the previous arrangement, if the PDSCH/PUSCH has more than N symbols crossing slot boundary, truncation is NOT performed and the entire PDSCH/PUSCH is transmitted in the next slot using one of the above arrangements. In other words, the communications device is configured, if the number of symbols of the temporally posterior time divided slot containing a portion of the one of the PUSCH and the PDSCH is greater than N symbols, to determine that the one of the PUSCH and the PDSCH is shifted in time so as to be wholly contained within the temporally posterior time divided slot.

The network can configure the UE such that S always follows legacy (i.e. always relative to slot boundary) or S can use some of the above arrangements, i.e. be relative to a PDCCH point depending upon other parameters or indicators.

In some arrangements, the PDCCH point may be the start of the PDCCH transmission. In other words, the specified point associated with the PDCCH in which the one of the uplink grant and the downlink grant was received is the start of the set of radio resources forming the PDCCH. Alternatively, in some arrangements, the PDCCH point may be the middle of the PDCCH transmission. In other words, the specified point associated with the PDCCH in which the one of the uplink grant and the downlink grant was received is in the middle of the set of radio resources forming the PDCCH between the start of the set of radio resources forming the PDCCH and the end of the set of radio resources forming the PDCCH. Alternatively, in some arrangements, the PDCCH point may be the end of the PDCCH transmission. In other words, the specified point associated with the PDCCH in which the one of the uplink grant and the downlink grant was received is the end of the set of radio resources forming the PDCCH.

In some arrangements, the PDCCH point may be the start of the PDCCH search space set. In other words, the specified point associated with the PDCCH in which the one of the uplink grant and the downlink grant was received is the start of a search space set of the PDCCH, the search space set comprising all of the possible locations within the radio resources of the wireless access interface that the PDCCH may be received. Alternatively, in some arrangements, the PDCCH point may be the middle of the PDCCH search space set. In other words, the specified point associated with the PDCCH in which the one of the uplink grant and the downlink grant was received is in the middle of a search space set of the PDCCH between the start of the search space set and the end of the search space set, the search space set comprising all of the possible locations within the radio resources of the wireless access interface that the PDCCH may be received. Alternatively, in some arrangements, the PDCCH point may be the end of the PDCCH search space set. In other words, the specified point associated with the PDCCH in which the one of the uplink grant and the downlink grant was received is the end of a search space set of the PDCCH, the search space set comprising all of the possible locations within the radio resources of the wireless access interface that the PDCCH may be received.

In some arrangements, the PDCCH may be the start of the CORESET containing the PDCCH transmission. In other words, the specified point associated with the PDCCH in which the one of the uplink grant and the downlink grant was received is the start of a set of radio resources forming a control-resource set, CORESET, that comprises the PDCCH. As those skilled in the art would understand, CORESET is a set of physical resources (i.e. a specific area within the NR Downlink Resource Grid) and a set of parameters that is used to carry a PDCCH/DCI. While in the LTE PDCCH region, the PDCCH is always spread across the whole channel bandwidth, the NR CORESET region is localised to a specific region in the frequency domain. Alternatively, in some arrangements, the PDCCH may be the middle of the CORESET containing the PDCCH transmission. In other words, the specified point associated with the PDCCH in which the one of the uplink grant and the downlink grant was received is in the middle of a set of radio resources forming a control-resource set, CORESET, that comprises the PDCCH between the start of the set of radio resources forming the CORESET and the end of the set of radio resources forming the CORESET. Alternatively, in some arrangements, the PDCCH point may be the end of the CORESET containing the PDCCH transmission. In other words, the specified point associated with the PDCCH in which the one of the uplink grant and the downlink grant was received is the end of a set of radio resources forming a control-resource set, CORESET, that comprises the PDCCH.

Flow Chart Representation

Figure 15:
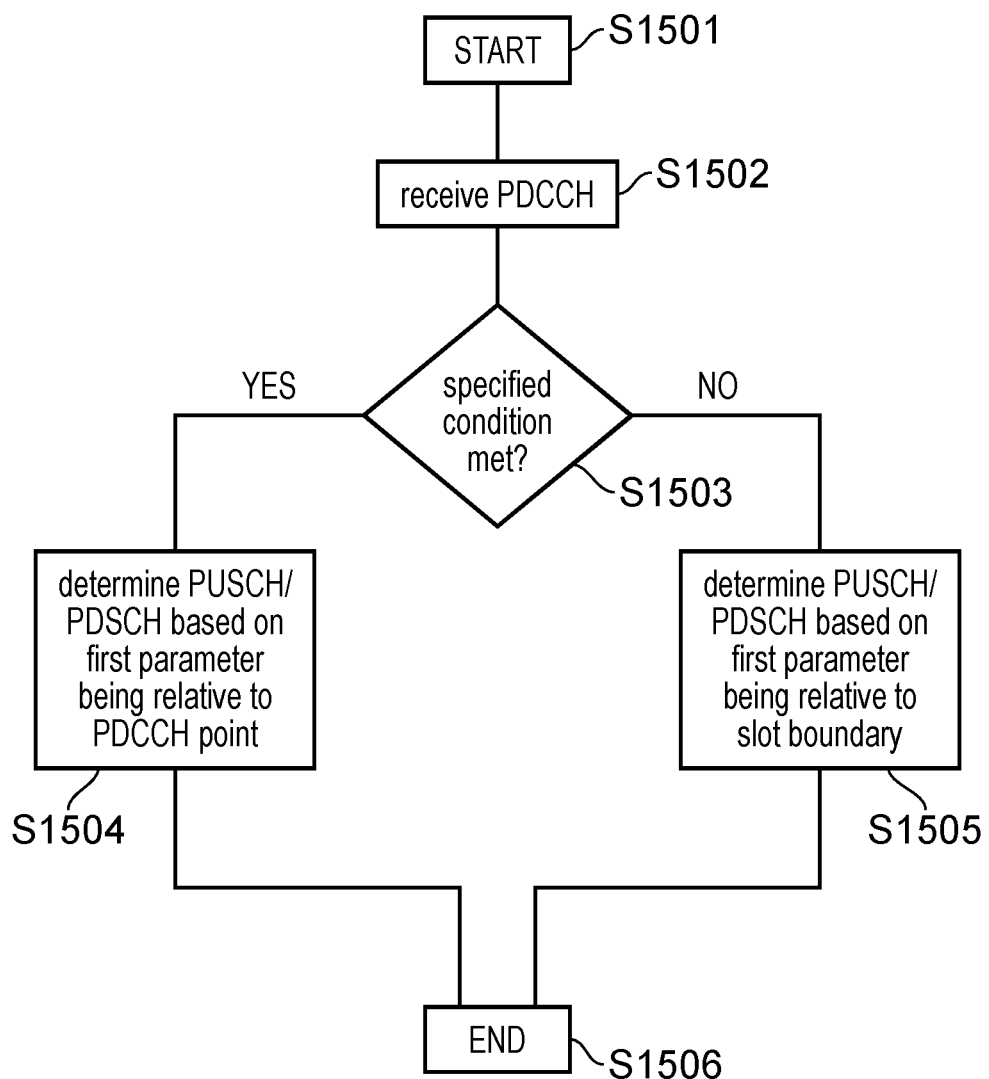
FIG. 15 shows a flow diagram illustrating a process of communications in a communications system in accordance with embodiments of the present technique.

FIG. 15 shows a flow diagram illustrating a process of communications in a communications system in accordance with embodiments of the present technique. The process shown by FIG. 15 is a method of operating a communications device configured to transmit data to or receive data from an infrastructure equipment of a wireless communications network.

The method begins in step S1501. The method comprises, in step S1502, receiving, from the infrastructure equipment, in one of a plurality of sets of radio resources each forming a physical downlink control channel, PDDCH, in a first time divided slot of a wireless access interface provided by the wireless communications network, one of an uplink grant indicating an allocation of radio resources forming a physical uplink shared channel, PUSCH, of the wireless access interface and a downlink grant indicating an allocation of radio resources forming a physical downlink shared channel, PDSCH, of the wireless access interface. In step S1503, the method comprises determining if a specified condition has been met. If the specified condition has been met, the process moves to step S1504, which comprises determining the one of the allocation of radio resources forming the PUSCH from the uplink grant and the allocation of radio resources forming the PDSCH from the downlink grant based on at least a first parameter, wherein the communications device is configured to interpret a value of the first parameter as indicating a number of symbols between a specified point associated with the PDCCH in which the one of the uplink grant and the downlink grant was received and a first symbol of the one of the PUSCH and the PDSCH. If the specified condition has not been met however, the process moves instead to step S1505, which comprises determining the one of the allocation of radio resources forming the PUSCH from the uplink grant and the allocation of radio resources forming the PDSCH from the downlink grant based on at least the first parameter, wherein the communications device is configured to interpret a value of the first parameter as indicating a number of symbols between the start of the first time divided slot and a first symbol of the one of the PUSCH and the PDSCH. The method ends in step S1506.

Those skilled in the art would appreciate that the method shown by FIG. 15 may be adapted in accordance with embodiments of the present technique. For example, other intermediate steps may be included in the method, or the steps may be performed in any logical order.

Though embodiments of the present technique have been described largely by way of the example communications system shown in FIG. 10, and in accordance with the examples of FIGS. 11 to 14, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device configured to transmit data to or receive data from an infrastructure equipment of a wireless communications network, the communications device comprising transceiver circuitry configured to transmit signals and receive signals via a wireless access interface provided by the wireless communications network, and controller circuitry configured in combination with the transceiver circuitry to receive, from the infrastructure equipment, in one of a plurality of sets of radio resources each forming a physical downlink control channel, PDDCH, in a first time divided slot of the wireless access interface, one of an uplink grant indicating an allocation of radio resources forming a physical uplink shared channel, PUSCH, of the wireless access interface and a downlink grant indicating an allocation of radio resources forming a physical downlink shared channel, PDSCH, of the wireless access interface, to determine if a specified condition has been met, and if the specified condition has been met, the controller circuitry is configured in combination with the transceiver circuitry to determine the one of the allocation of radio resources forming the PUSCH from the uplink grant and the allocation of radio resources forming the PDSCH from the downlink grant based on at least a first parameter, wherein the communications device is configured to interpret a value of the first parameter as indicating a number of symbols between a specified point associated with the PDCCH in which the one of the uplink grant and the downlink grant was received and a first symbol of the one of the PUSCH and the PDSCH, or if the specified condition has not been met, the controller circuitry is configured in combination with the transceiver circuitry to determine the one of the allocation of radio resources forming the PUSCH from the uplink grant and the allocation of radio resources forming the PDSCH from the downlink grant based on at least the first parameter, wherein the communications device is configured to interpret a value of the first parameter as indicating a number of symbols between the start of the first time divided slot and a first symbol of the one of the PUSCH and the PDSCH.

Paragraph 2. A communications device according to Paragraph 1, wherein the specified condition is a value of a second parameter, wherein the second parameter indicates a number of time divided slots of the wireless access interface after the first time divided slot to a second time divided slot of the wireless access interface within which the one of the PUSCH and the PDSCH is located.

Paragraph 3. A communications device according to Paragraph 1, wherein the specified condition is whether the one of the PUSCH and the PDSCH is wholly contained within a single time divided slot of the wireless access interface.

Paragraph 4. A communications device according to Paragraph 3, wherein, if the specified condition has not been met, the value of the first parameter is 0 and the communications device is configured to determine that the one of the PUSCH and the PDSCH is contained within a temporally subsequent time divided slot to the first time divided slot.

Paragraph 5. A communications device according to Paragraph 3, wherein, if the specified condition has not been met, the value of the first parameter is the same as a value of the first parameter as if the specified condition had been met and the communications device is configured to determine that the one of the PUSCH and the PDSCH is contained within a temporally subsequent time divided slot to the first time divided slot.

Paragraph 6. A communications device according to Paragraph 1, wherein the predefined condition is the value of a dynamic indicator received by the communications device from the infrastructure equipment.

Paragraph 7. A communications device according to Paragraph 1, wherein the communications device is configured
to receive an indication of an index of a look-up table,
to determine a value of the first parameter from the look-up table in accordance with the indicated index, and
to determine, from the look-up table in accordance with the indicated index, whether the value of the first parameter indicates a number of symbols between the specified point associated with the PDCCH and the first symbol of the one of the PUSCH and the PDSCH, or whether the value of the first parameter indicates a number of symbols between the start of the first time divided slot and the first symbol of the one of the PUSCH and the PDSCH.

Paragraph 8. A communications device according to Paragraph 1, wherein the predefined condition is the value of the indicated index.

Paragraph 9. A communications device according to Paragraph 1, wherein, if the specified condition has been met, the communications device is configured
to determine whether the one of the PUSCH and the PDSCH is wholly contained within a single time divided slot of the wireless access interface, and
if the one of the PUSCH and the PDSCH is not wholly contained within a single time divided slot of the wireless access interface, to determine if a number of symbols of the temporally posterior time divided slot containing a portion of the one of the PUSCH and the PDSCH is less than or equal to a predefined number of, N, symbols, and
if the number of symbols of the temporally posterior time divided slot containing a portion of the one of the PUSCH and the PDSCH is less than or equal to N symbols, to determine that the one of the PUSCH and the PDSCH is truncated by between one and N symbols.

Paragraph 10. A communications device according to Paragraph 9, wherein the communications device is configured, if the number of symbols of the temporally posterior time divided slot containing a portion of the one of the PUSCH and the PDSCH is greater than N symbols, to determine that the one of the PUSCH and the PDSCH is shifted in time so as to be wholly contained within the temporally posterior time divided slot.

Paragraph 11. A communications device according to Paragraph 1, wherein the specified point associated with the PDCCH in which the one of the uplink grant and the downlink grant was received is the start of the set of radio resources forming the PDCCH.

Paragraph 12. A communications device according to Paragraph 1, wherein the specified point associated with the PDCCH in which the one of the uplink grant and the downlink grant was received is in the middle of the set of radio resources forming the PDCCH between the start of the set of radio resources forming the PDCCH and the end of the set of radio resources forming the PDCCH.

Paragraph 13. A communications device according to Paragraph 1, wherein the specified point associated with the PDCCH in which the one of the uplink grant and the downlink grant was received is the end of the set of radio resources forming the PDCCH.

Paragraph 14. A communications device according to Paragraph 1, wherein the specified point associated with the PDCCH in which the one of the uplink grant and the downlink grant was received is the start of a search space set of the PDCCH, the search space set comprising all of the possible locations within the radio resources of the wireless access interface that the PDCCH may be received.

Paragraph 15. A communications device according to Paragraph 1, wherein the specified point associated with the PDCCH in which the one of the uplink grant and the downlink grant was received is in the middle of a search space set of the PDCCH between the start of the search space set and the end of the search space set, the search space set comprising all of the possible locations within the radio resources of the wireless access interface that the PDCCH may be received.

Paragraph 16. A communications device according to Paragraph 1, wherein the specified point associated with the PDCCH in which the one of the uplink grant and the downlink grant was received is the end of a search space set of the PDCCH, the search space set comprising all of the possible locations within the radio resources of the wireless access interface that the PDCCH may be received.

Paragraph 17. A communications device according to Paragraph 1, wherein the specified point associated with the PDCCH in which the one of the uplink grant and the downlink grant was received is the start of a set of radio resources forming a control-resource set, CORESET, that comprises the PDCCH.

Paragraph 18. A communications device according to Paragraph 1, wherein the specified point associated with the PDCCH in which the one of the uplink grant and the downlink grant was received is in the middle of a set of radio resources forming a control-resource set, CORESET, that comprises the PDCCH between the start of the set of radio resources forming the CORESET and the end of the set of radio resources forming the CORESET.

Paragraph 19. A communications device according to Paragraph 1, wherein the specified point associated with the PDCCH in which the one of the uplink grant and the downlink grant was received is the end of a set of radio resources forming a control-resource set, CORESET, that comprises the PDCCH.

Paragraph 20. A method of operating a communications device configured to transmit data to or receive data from an infrastructure equipment of a wireless communications network, the method comprising
- receiving, from the infrastructure equipment, in one of a plurality of sets of radio resources each forming a physical downlink control channel, PDDCH, in a first time divided slot of a wireless access interface provided by the wireless communications network, one of an uplink grant indicating an allocation of radio resources forming a physical uplink shared channel, PUSCH, of the wireless access interface and a downlink grant indicating an allocation of radio resources forming a physical downlink shared channel, PDSCH, of the wireless access interface,
- determining if a specified condition has been met, and
- if the specified condition has been met, determining the one of the allocation of radio resources forming the PUSCH from the uplink grant and the allocation of radio resources forming the PDSCH from the downlink grant based on at least a first parameter, wherein the communications device is configured to interpret a value of the first parameter as indicating a number of symbols between a specified point associated with the PDCCH in which the one of the uplink grant and the downlink grant was received and a first symbol of the one of the PUSCH and the PDSCH, or
- if the specified condition has not been met, determining the one of the allocation of radio resources forming the one of the PUSCH from the uplink grant and the allocation of radio resources forming the PDSCH from the downlink grant based on at least the first parameter, wherein the communications device is configured to interpret a value of the first parameter as indicating a number of symbols between the start of the first time divided slot and a first symbol of the one of the PUSCH and the PDSCH.

Paragraph 21. Circuitry for a communications device configured to transmit data to or receive data from an infrastructure equipment of a wireless communications network, the communications device comprising
- transceiver circuitry configured to transmit signals and receive signals via a wireless access interface provided by the wireless communications network, and
- controller circuitry configured in combination with the transceiver circuitry
- to receive, from the infrastructure equipment, in one of a plurality of sets of radio resources each forming a physical downlink control channel, PDDCH, in a first time divided slot of the wireless access interface, one of an uplink grant indicating an allocation of radio resources forming a physical uplink shared channel, PUSCH, of the wireless access interface and a downlink grant indicating an allocation of radio resources forming a physical downlink shared channel, PDSCH, of the wireless access interface,
- to determine if a specified condition has been met, and
- if the specified condition has been met, the controller circuitry is configured in combination with the transceiver circuitry to determine the one of the allocation of radio resources forming the PUSCH from the uplink grant and the allocation of radio resources forming the PDSCH from the downlink grant based on at least a first parameter, wherein the communications device is configured to interpret a value of the first parameter as indicating a number of symbols between a specified point associated with the PDCCH in which the one of the uplink grant and the downlink grant was received and a first symbol of the one of the PUSCH and the PDSCH, or
- if the specified condition has not been met, the controller circuitry is configured in combination with the transceiver circuitry to determine the one of the allocation of radio resources forming the PUSCH from the uplink grant and the allocation of radio resources forming the PDSCH from the downlink grant based on at least the first parameter, wherein the communications device is configured to interpret a value of the first parameter as indicating a number of symbols between the start of the first time divided slot and a first symbol of the one of the PUSCH and the PDSCH.

Paragraph 22. An infrastructure equipment of a wireless communications network configured to transmit data to or receive data from a communications device, the infrastructure equipment comprising
- transceiver circuitry configured to transmit signals and receive signals via a wireless access interface provided by the wireless communications network, and
- controller circuitry configured in combination with the transceiver circuitry
- to transmit, to the communications device, in one of a plurality of sets of radio resources each forming a physical downlink control channel, PDDCH, in a first time divided slot of the wireless access interface, one of an uplink grant indicating an allocation of radio resources forming a physical uplink shared channel, PUSCH, of the wireless access interface and a downlink grant indicating an allocation of radio resources forming a physical downlink shared channel, PDSCH, of the wireless access interface, and
- to transmit, to the communications device, an indication of an index of a look-up table associated with a value of a first parameter in the look-up table,
- wherein, if a specified condition has been met, the value of the first parameter indicates a number of symbols between a specified point associated with the PDCCH in which the one of the uplink grant and the downlink grant was received and a first symbol of the one of the PUSCH and the PDSCH, or if the specified condition has not been met, value of the first parameter indicates a number of symbols between the start of the first time divided slot and a first symbol of the one of the PUSCH and the PDSCH.

Paragraph 23. An infrastructure equipment according to Paragraph 22, wherein the specified condition is a value of a second parameter, wherein the second parameter indicates a number of time divided slots of the wireless access interface after the first time divided slot to a second time divided slot of the wireless access interface within which the one of the PUSCH and the PDSCH is located.

Paragraph 24. An infrastructure equipment according to Paragraph 22, wherein the specified condition is whether the one of the PUSCH and the PDSCH is wholly contained within a single time divided slot of the wireless access interface.

Paragraph 25. An infrastructure equipment according to Paragraph 24, wherein, if the specified condition has not been met, the value of the first parameter is 0 and the one of the uplink grant and the downlink grant indicates that the one of the PUSCH and the PDSCH is contained within a temporally subsequent time divided slot to the first time divided slot.

Paragraph 26. An infrastructure equipment according to Paragraph 24, wherein, if the specified condition has not been met, the value of the first parameter is the same as a value of the first parameter as if the specified condition had been met and the one of the uplink grant and the downlink grant indicates that the one of the PUSCH and the PDSCH is contained within a temporally subsequent time divided slot to the first time divided slot.

Paragraph 27. An infrastructure equipment according to Paragraph 22, wherein the predefined condition is the value of a dynamic indicator transmitted to the communications device by the infrastructure equipment.

Paragraph 28. An infrastructure equipment according to Paragraph 22, wherein the predefined condition is the value of the indicated index.

Paragraph 29. An infrastructure equipment according to Paragraph 22, wherein the specified point associated with the PDCCH in which the one of the uplink grant and the downlink grant was received is the start of the set of radio resources forming the PDCCH.

Paragraph 30. An infrastructure equipment according to Paragraph 22, wherein the specified point associated with the PDCCH in which the one of the uplink grant and the downlink grant was received is in the middle of the set of radio resources forming the PDCCH between the start of the set of radio resources forming the PDCCH and the end of the set of radio resources forming the PDCCH.

Paragraph 31. An infrastructure equipment according to Paragraph 22, wherein the specified point associated with the PDCCH in which the one of the uplink grant and the downlink grant was received is the end of the set of radio resources forming the PDCCH.

Paragraph 32. An infrastructure equipment according to Paragraph 22, wherein the specified point associated with the PDCCH in which the one of the uplink grant and the downlink grant was received is the start of a search space set of the PDCCH, the search space set comprising all of the possible locations within the radio resources of the wireless access interface that the PDCCH may be received.

Paragraph 33. An infrastructure equipment according to Paragraph 22, wherein the specified point associated with the PDCCH in which the one of the uplink grant and the downlink grant was received is in the middle of a search space set of the PDCCH between the start of the search space set and the end of the search space set, the search space set comprising all of the possible locations within the radio resources of the wireless access interface that the PDCCH may be received.

Paragraph 34. An infrastructure equipment according to Paragraph 22, wherein the specified point associated with the PDCCH in which the one of the uplink grant and the downlink grant was received is the end of a search space set of the PDCCH, the search space set comprising all of the possible locations within the radio resources of the wireless access interface that the PDCCH may be received.

Paragraph 35. An infrastructure equipment according to Paragraph 22, wherein the specified point associated with the PDCCH in which the one of the uplink grant and the downlink grant was received is the start of a set of radio resources forming a control-resource set, CORESET, that comprises the PDCCH.

Paragraph 36. An infrastructure equipment according to Paragraph 22, wherein the specified point associated with the PDCCH in which the one of the uplink grant and the downlink grant was received is in the middle of a set of radio resources forming a control-resource set, CORESET, that comprises the PDCCH between the start of the set of radio resources forming the CORESET and the end of the set of radio resources forming the CORESET.

Paragraph 37. An infrastructure equipment according to Paragraph 22, wherein the specified point associated with the PDCCH in which the one of the uplink grant and the downlink grant was received is the end of a set of radio resources forming a control-resource set, CORESET, that comprises the PDCCH.

Paragraph 38. A method of operating an infrastructure equipment of a wireless communications network configured to transmit data to or receive data from a communications device, the method comprising transmitting, to the communications device, in one of a plurality of sets of radio resources each forming a physical downlink control channel, PDDCH, in a first time divided slot of a wireless access interface provided by the wireless communications network, one of an uplink grant indicating an allocation of radio resources forming a physical uplink shared channel, PUSCH, of the wireless access interface and a downlink grant indicating an allocation of radio resources forming a physical downlink shared channel, PDSCH, of the wireless access interface, and transmitting, to the communications device, an indication of an index of a look-up table associated with a value of a first parameter in the look-up table, wherein, if a specified condition has been met, the value of the first parameter indicates a number of symbols between a specified point associated with the PDCCH in which the one of the uplink grant and the downlink grant was received and a first symbol of the one of the PUSCH and the PDSCH, or if the specified condition has not been met, value of the first parameter indicates a number of symbols between the start of the first time divided slot and a first symbol of the one of the PUSCH and the PDSCH.

Paragraph 39. Circuitry for an infrastructure equipment of a wireless communications network configured to transmit data to or receive data from a communications device, the infrastructure equipment comprising transceiver circuitry configured to transmit signals and receive signals via a wireless access interface provided by the wireless communications network, and controller circuitry configured in combination with the transceiver circuitry to transmit, to the communications device, in one of a plurality of sets of radio resources each forming a physical downlink control channel, PDDCH, in a first time divided slot of the wireless access interface, one of an uplink grant indicating an allocation of radio resources forming one of a physical uplink shared channel, PUSCH, of the wireless access interface and a downlink grant indicating an allocation of radio resources forming a physical downlink shared channel, PDSCH, of the wireless access interface, and to transmit, to the communications device, an indication of an index of a look-up table associated with a value of a first parameter in the look-up table, wherein, if a specified condition has been met, the value of the first parameter indicates a number of symbols between a specified point associated with the PDCCH in which the one of the uplink grant and the downlink grant was received and a first symbol of the one of the PUSCH and the PDSCH, or if the specified condition has not been met, value of the first parameter indicates a number of symbols between the start of the first time divided slot and a first symbol of the one of the PUSCH and the PDSCH.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009.
[3] 3GPP TS 38.321, "Medium Access Control (MAC) protocol specification (Rel-15)", v15.3.0.
[4] RP-190726, "Physical layer enhancements for NR ultra-reliable and low latency communication (URLLC)", Huawei, HiSilicon, RAN #83.
[5] R1-1906057, "PDCCH enhancements for URLLC", Huawei, HiSilicon, RAN1 #97.
[6] R1-1906751, "On PDCCH enhancements for NR URLLC", Nokia, Nokia Shanghai Bell, RAN1 #97.

What is claimed is:

1. A communications device configured to transmit data to or receive the data from an infrastructure equipment of a wireless communications network, the communications device comprising:
  transceiver circuitry configured to transmit signals and receive the signals via a wireless access interface provided by the wireless communications network, and
  controller circuitry configured in combination with the transceiver circuitry
    to receive, from the infrastructure equipment, in one of a plurality of sets of radio resources each forming a physical downlink control channel (PDDCH) in a first time divided slot of the wireless access interface, one of an uplink grant indicating an allocation of radio resources forming a physical uplink shared channel (PUSCH) of the wireless access interface and a downlink grant indicating an allocation of radio resources forming a physical downlink shared channel (PDSCH) of the wireless access interface,
    to determine if a specified condition has been met, and
    in response to the specified condition being met, the controller circuitry is configured in combination with the transceiver circuitry to determine the one of the allocation of radio resources forming the PUSCH from the uplink grant and the allocation of radio resources forming the PDSCH from the downlink grant based on at least a first parameter, wherein the communications device is configured to interpret a value of the first parameter as indicating a number of symbols between a specified point associated with the PDCCH in which the one of the uplink grant and the downlink grant was received and a first symbol of the one of the PUSCH and the PDSCH, and
    in response to the specified condition not being met, the controller circuitry is configured in combination with the transceiver circuitry to determine the one of the allocation of radio resources forming the PUSCH from the uplink grant and the allocation of radio resources forming the PDSCH from the downlink grant based on at least the first parameter, wherein the communications device is configured to interpret a value of the first parameter as indicating a number of symbols between a start of the first time divided slot and a first symbol of the one of the PUSCH and the PDSCH,
  wherein the specified condition includes at least a value of a second parameter, and the second parameter indicates a number of time divided slots of the wireless access interface after the first time divided slot to a second time divided slot of the wireless access interface within which the one of the PUSCH and the PDSCH is located.

2. The communications device according to claim 1, wherein the specified condition further includes whether the one of the PUSCH and the PDSCH is wholly contained within a single time divided slot of the wireless access interface.

3. The communications device according to claim 2, wherein, if the specified condition has not been met, the value of the first parameter is 0 and the communications device is configured to determine that the one of the PUSCH and the PDSCH is contained within a temporally subsequent time divided slot to the first time divided slot.

4. The communications device according to claim 2, wherein, if the specified condition has not been met, the value of the first parameter is the same as a value of the first parameter as if the specified condition had been met and the communications device is configured to determine that the one of the PUSCH and the PDSCH is contained within a temporally subsequent time divided slot to the first time divided slot.

5. The communications device according to claim 1, wherein the specified condition includes the value of a dynamic indicator received by the communications device from the infrastructure equipment.

6. The communications device according to claim 1, wherein the communications device is configured:
to receive an indication of an index of a look-up table,
to determine a value of the first parameter from the look-up table in accordance with the indicated index, and
to determine, from the look-up table in accordance with the indicated index, whether the value of the first parameter indicates a number of symbols between the specified point associated with the PDCCH and the first symbol of the one of the PUSCH and the PDSCH, or whether the value of the first parameter indicates a number of symbols between the start of the first time divided slot and the first symbol of the one of the PUSCH and the PDSCH.

7. The communications device according to claim 1, wherein the specified condition includes the value of the indicated index.

8. The communications device according to claim 1, wherein, if the specified condition has been met, the communications device is configured:
to determine whether the one of the PUSCH and the PDSCH is wholly contained within a single time divided slot of the wireless access interface, and
if the one of the PUSCH and the PDSCH is not wholly contained within a single time divided slot of the wireless access interface, to determine if a number of symbols of the temporally posterior time divided slot containing a portion of the one of the PUSCH and the PDSCH is less than or equal to a predefined number of, N, symbols, and
if the number of symbols of the temporally posterior time divided slot containing a portion of the one of the PUSCH and the PDSCH is less than or equal to N symbols, to determine that the one of the PUSCH and the PDSCH is truncated by between one and N symbols.

9. The communications device according to claim 1, wherein the specified point associated with the PDCCH in which the one of the uplink grant and the downlink grant was received is a start of the set of radio resources forming the PDCCH.

10. The communications device according to claim 1, wherein the specified point associated with the PDCCH in which the one of the uplink grant and the downlink grant was received is in a middle of the set of radio resources forming the PDCCH between a start of the set of radio resources forming the PDCCH and an end of the set of radio resources forming the PDCCH.

11. The communications device according to claim 1, wherein the specified point associated with the PDCCH in which the one of the uplink grant and the downlink grant was received is an end of the set of radio resources forming the PDCCH.

12. The communications device according to claim 1, wherein the specified point associated with the PDCCH in which the one of the uplink grant and the downlink grant was received is a start of a search space set of the PDCCH, the search space set comprising all possible locations within the plurality of sets of radio resources of the wireless access interface that the PDCCH may be received.

13. The communications device according to claim 1, wherein the specified point associated with the PDCCH in which the one of the uplink grant and the downlink grant was received is in the middle of a search space set of the PDCCH between a start of the search space set and an end of the search space set, the search space set comprising all possible locations within the radio resources of the wireless access interface that the PDCCH may be received.

14. The communications device according to claim 1, wherein the specified point associated with the PDCCH in which the one of the uplink grant and the downlink grant was received is an end of a search space set of the PDCCH, the search space set comprising all possible locations within the plurality of sets of radio resources of the wireless access interface that the PDCCH may be received.

15. The communications device according to claim 1, wherein the specified point associated with the PDCCH in which the one of the uplink grant and the downlink grant was received is the start of a set of radio resources forming a control-resource set (CORESET) that comprises the PDCCH.

16. The communications device according to claim 1, wherein the specified point associated with the PDCCH in which the one of the uplink grant and the downlink grant was received is in a middle of a set of radio resources forming a control-resource set (CORESET) that comprises the PDCCH between the start of the set of radio resources forming the CORESET and the end of the set of radio resources forming the CORESET.

17. The communications device according to claim 1, wherein the specified point associated with the PDCCH in which the one of the uplink grant and the downlink grant was received is the end of a set of radio resources forming a control-resource set (CORESET) that comprises the PDCCH.

18. A method of operating a communications device configured to transmit data to or receive the data from an infrastructure equipment of a wireless communications network, the method comprising:
receiving, from the infrastructure equipment, in one of a plurality of sets of radio resources each forming a physical downlink control channel (PDDCH) in a first time divided slot of a wireless access interface provided by the wireless communications network, one of an uplink grant indicating an allocation of radio resources forming a physical uplink shared channel (PUSCH) of the wireless access interface and a downlink grant indicating an allocation of radio resources forming a physical downlink shared channel (PDSCH) of the wireless access interface,
determining if a specified condition has been met, and
in response to the specified condition being met, determining the one of the allocation of radio resources forming the PUSCH from the uplink grant and the allocation of radio resources forming the PDSCH from the downlink grant based on at least a first parameter, wherein the communications device is configured to interpret a value of the first parameter as indicating a number of symbols between a specified point associated with the PDCCH in which the one of the uplink grant and the downlink grant was received and a first symbol of the one of the PUSCH and the PDSCH, and
in response to the specified condition not being met, determining the one of the allocation of radio resources forming the one of the PUSCH from the uplink grant and the allocation of radio resources forming the PDSCH from the downlink grant based on at least the first parameter, wherein the communications device is configured to interpret a value of the first parameter as indicating a number of symbols between a start of the first time divided slot and a first symbol of the one of the PUSCH and the PDSCH, wherein the specified condition includes at least a value of a second parameter, and the second parameter indicates a number of time divided slots of the wireless access interface after the first time divided slot to a second time divided slot of the wireless access interface within which the one of the PUSCH and the PDSCH is located.

19. A method of operating an infrastructure equipment of a wireless communications network configured to transmit data to or receive data from a communications device, the method comprising:

transmitting, to the communications device, in one of a plurality of sets of radio resources each forming a physical downlink control channel (PDDCH) in a first time divided slot of a wireless access interface provided by the wireless communications network, one of an uplink grant indicating an allocation of radio resources forming a physical uplink shared channel (PUSCH) of the wireless access interface and a downlink grant indicating an allocation of radio resources forming a physical downlink shared channel (PDSCH) of the wireless access interface, and transmitting, to the communications device, an indication of an index of a look-up table associated with a value of a first parameter in the look-up table, wherein, in response to a specified condition being met, the value of the first parameter indicates a number of symbols between a specified point associated with the PDCCH in which the one of the uplink grant and the downlink grant was received and a first symbol of the one of the PUSCH and the PDSCH, and in response to the specified condition not being met, value of the first parameter indicates a number of symbols between the start of the first time divided slot and a first symbol of the one of the PUSCH and the PDSCH, wherein the specified condition includes at least a value of a second parameter, and the second parameter indicates a number of time divided slots of the wireless access interface after the first time divided slot to a second time divided slot of the wireless access interface within which the one of the PUSCH and the PDSCH is located.

* * * * *